T. E. HEETER.
WRAPPING, CARTONING, AND PACKING MACHINE.
APPLICATION FILED OCT. 29, 1915.
1,336,838.
Patented Apr. 13, 1920.
30 SHEETS—SHEET 5.
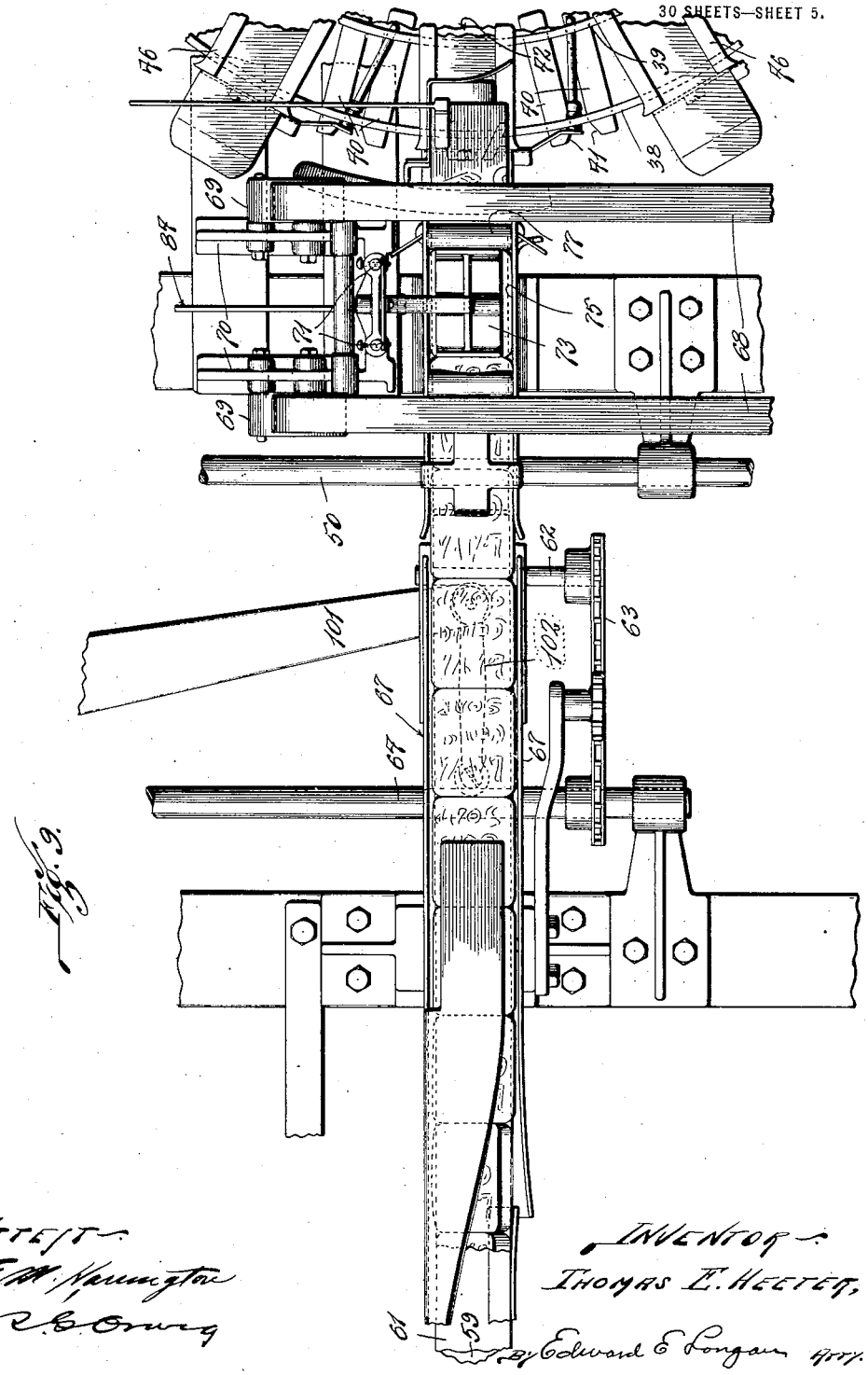

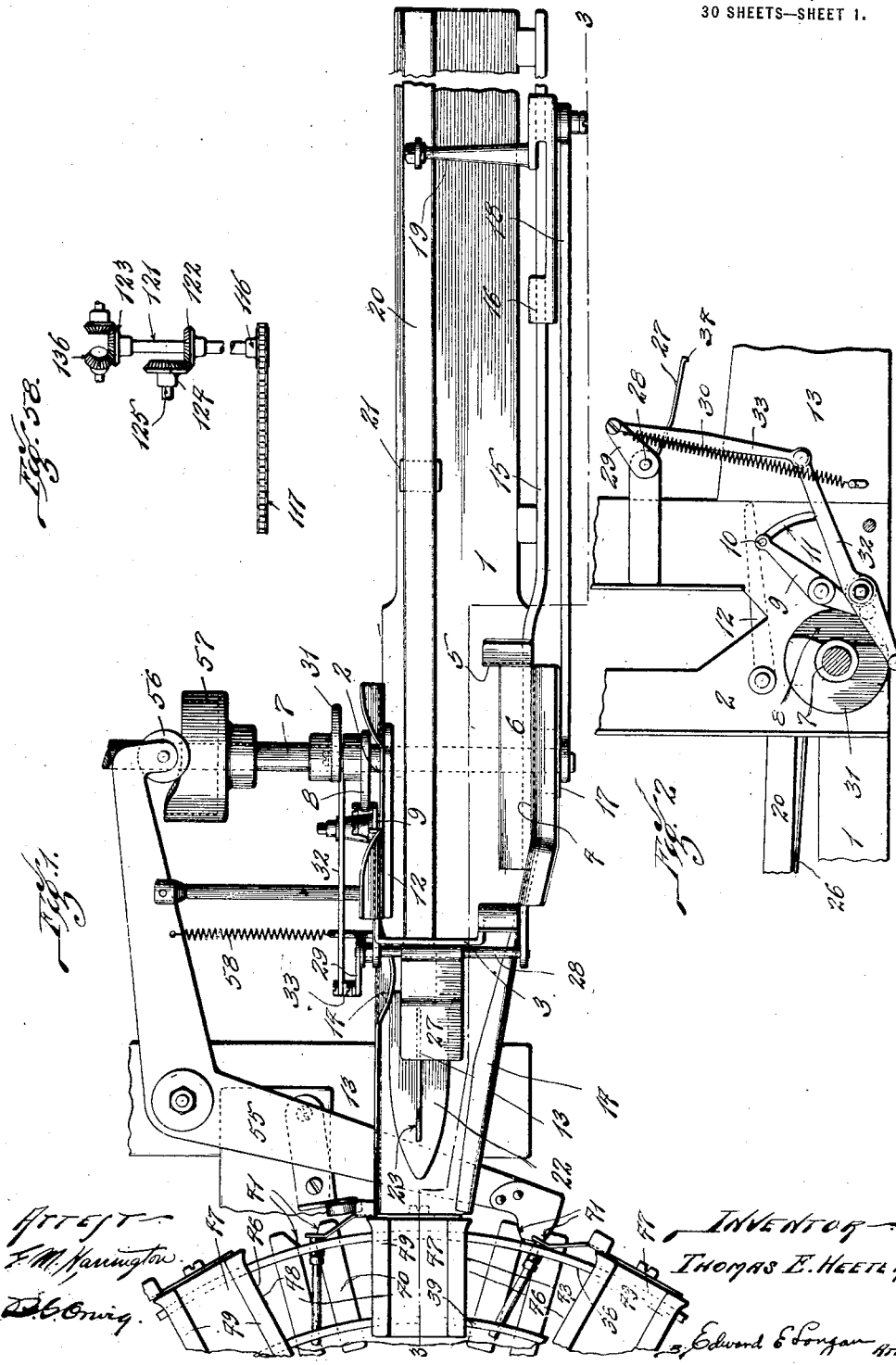

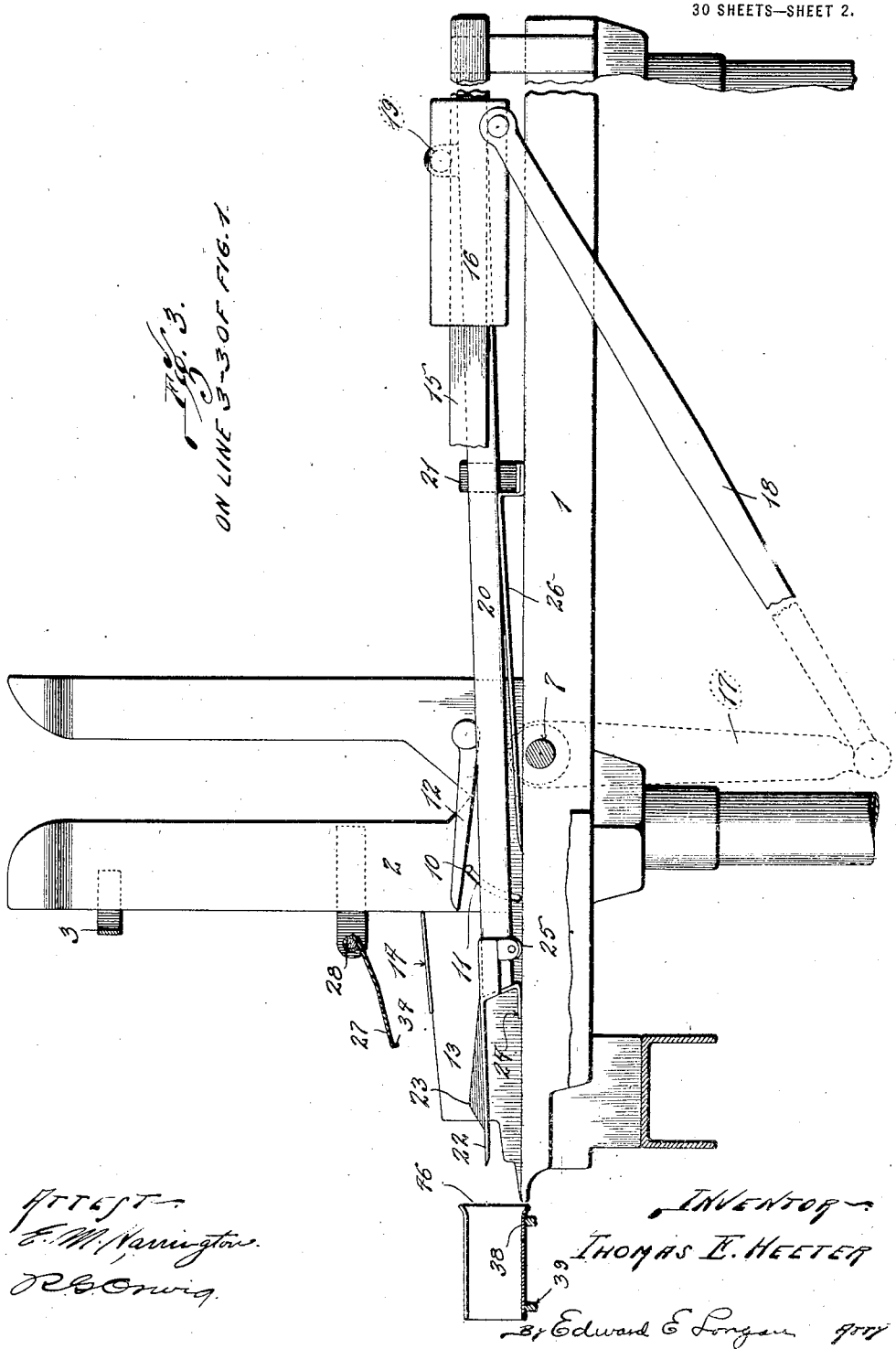

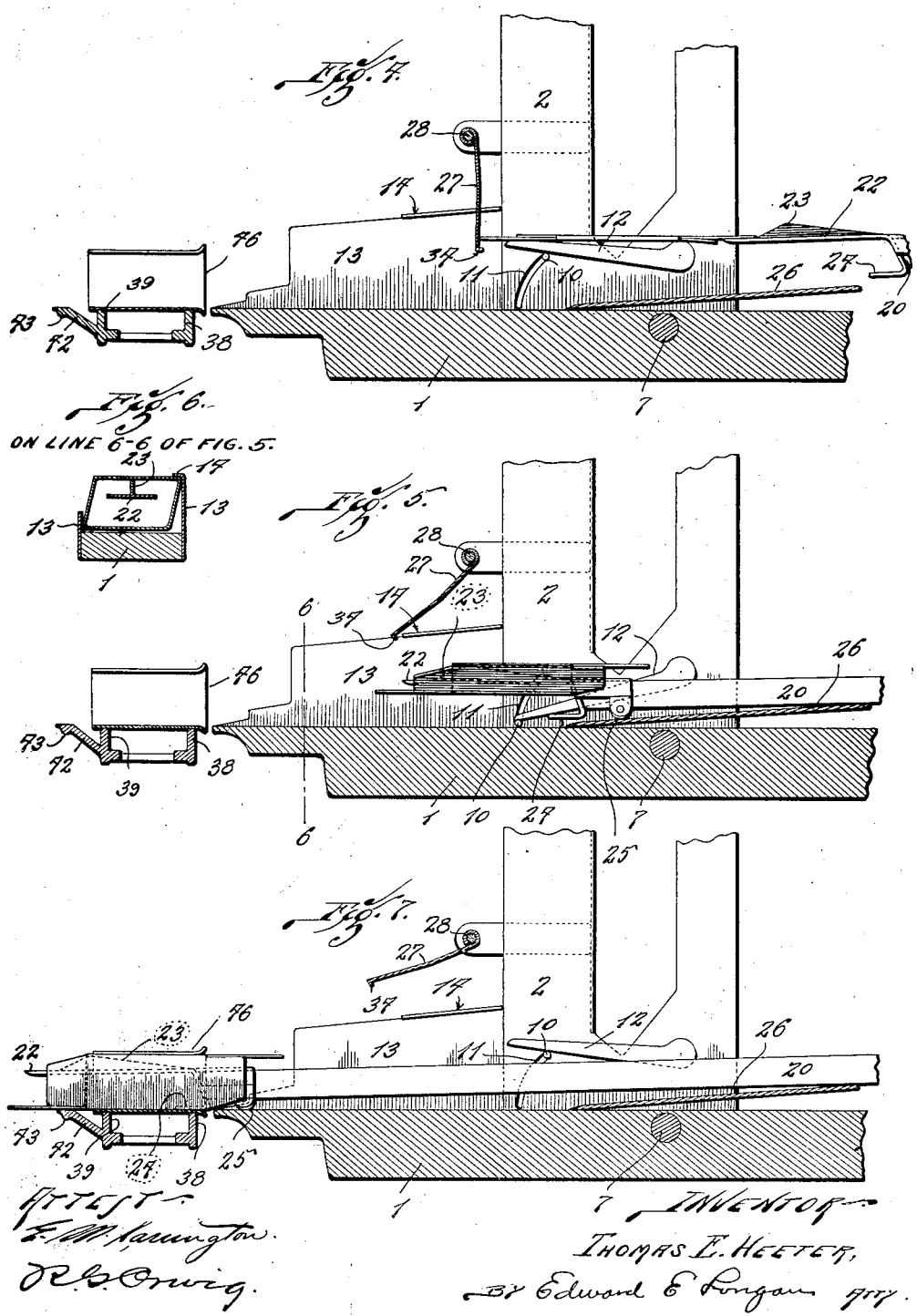

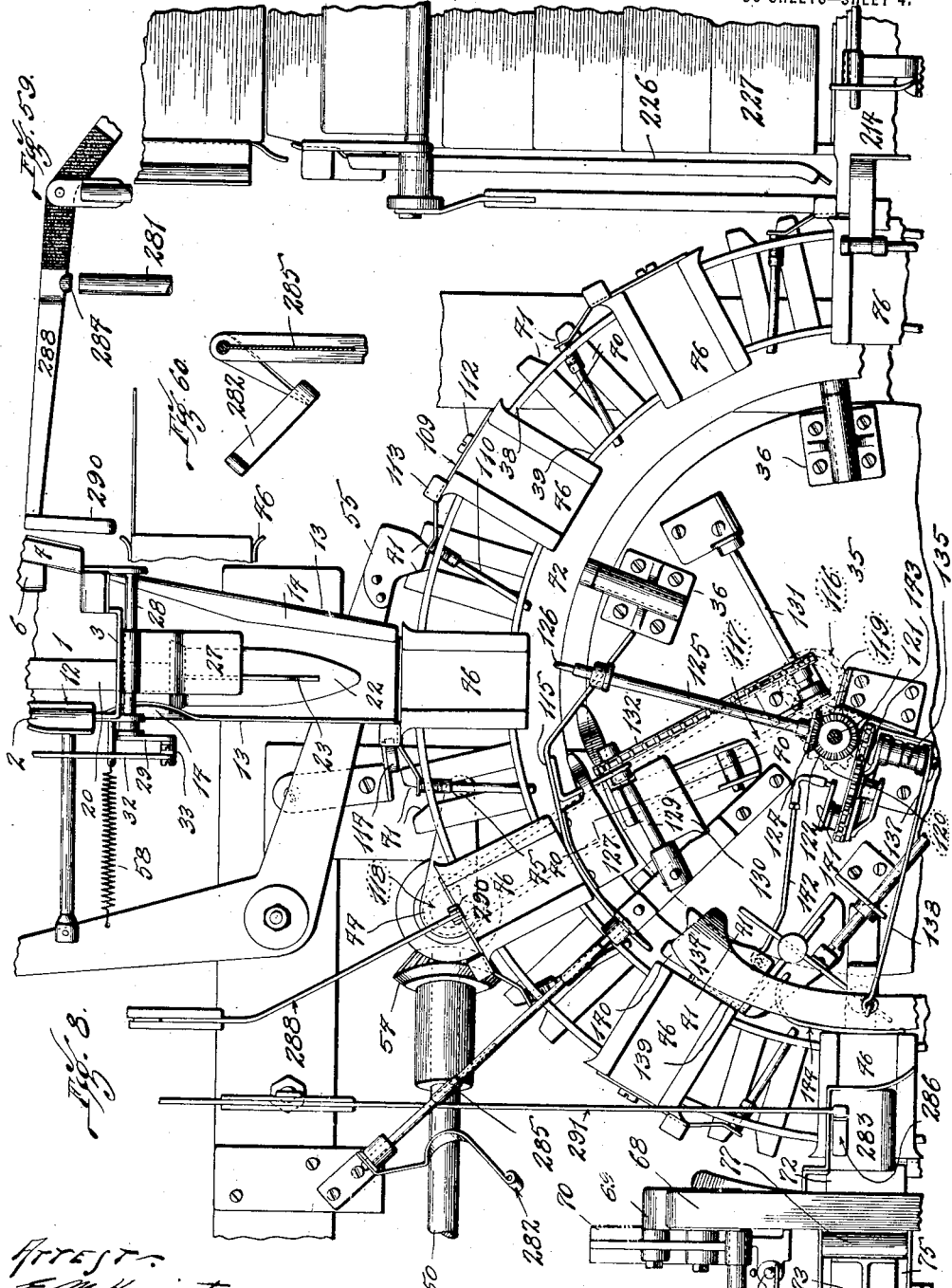

T. E. HEETER.
WRAPPING, CARTONING, AND PACKING MACHINE.
APPLICATION FILED OCT. 29, 1915.
1,336,838. Patented Apr. 13, 1920.
30 SHEETS—SHEET 6.
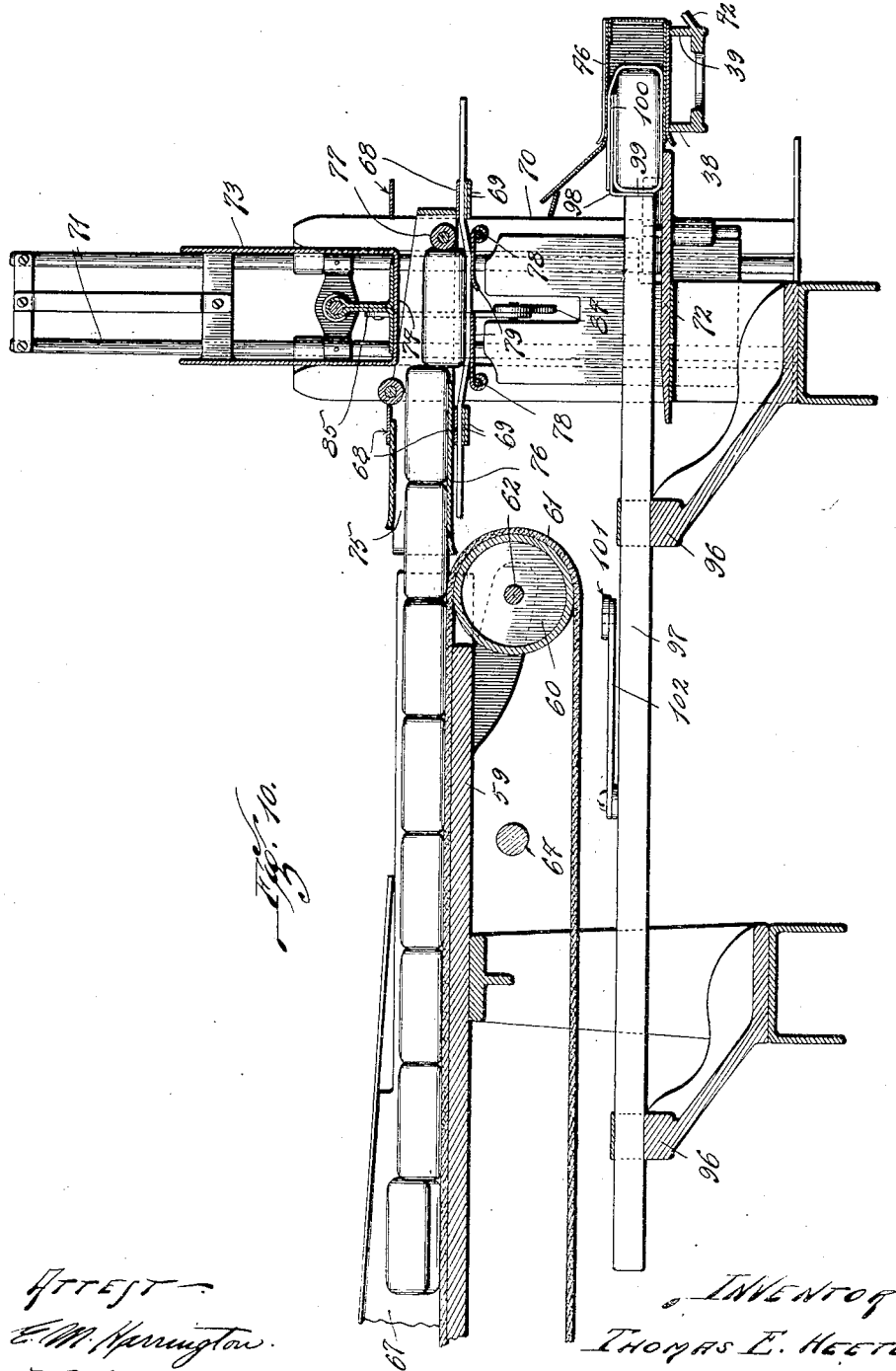

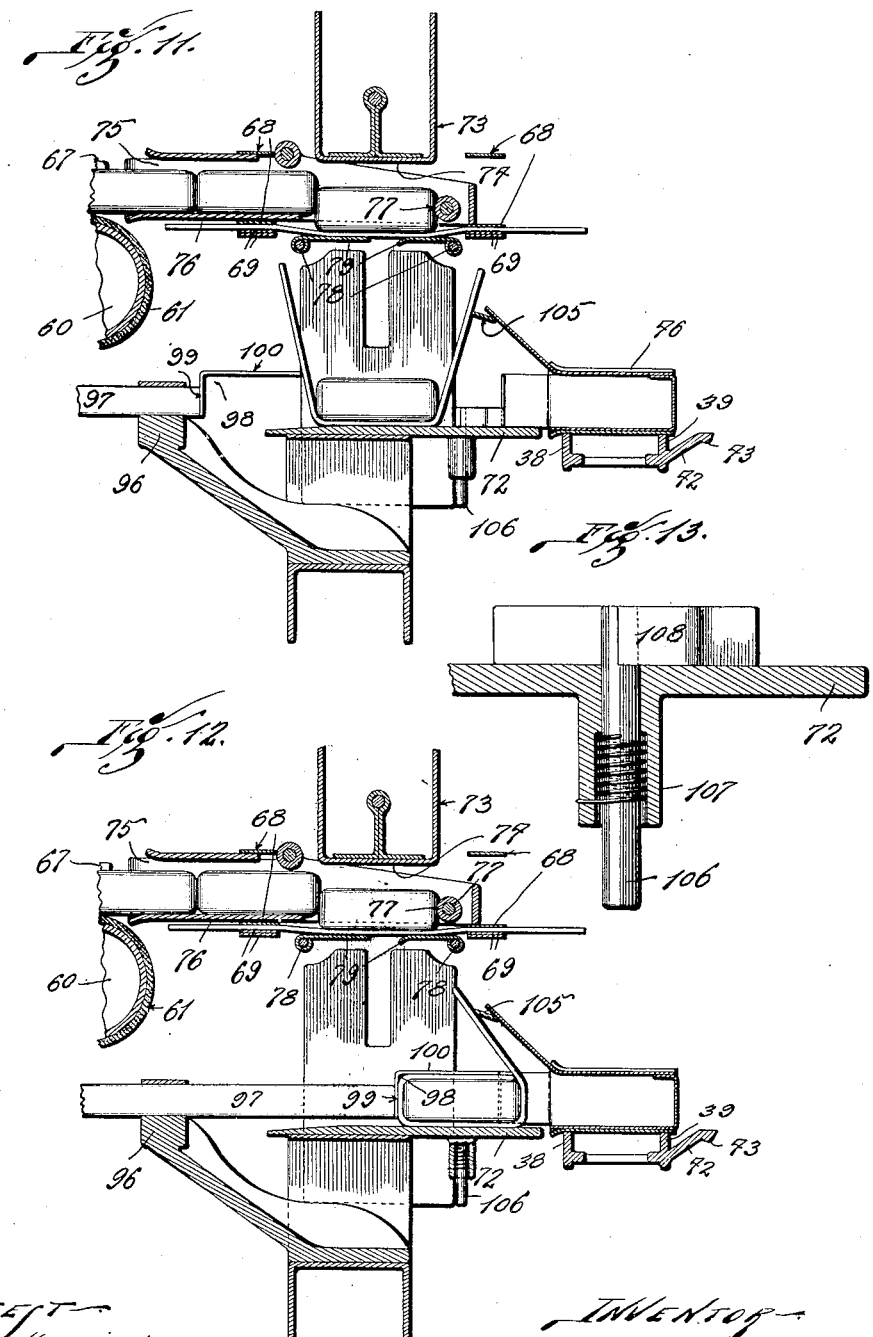

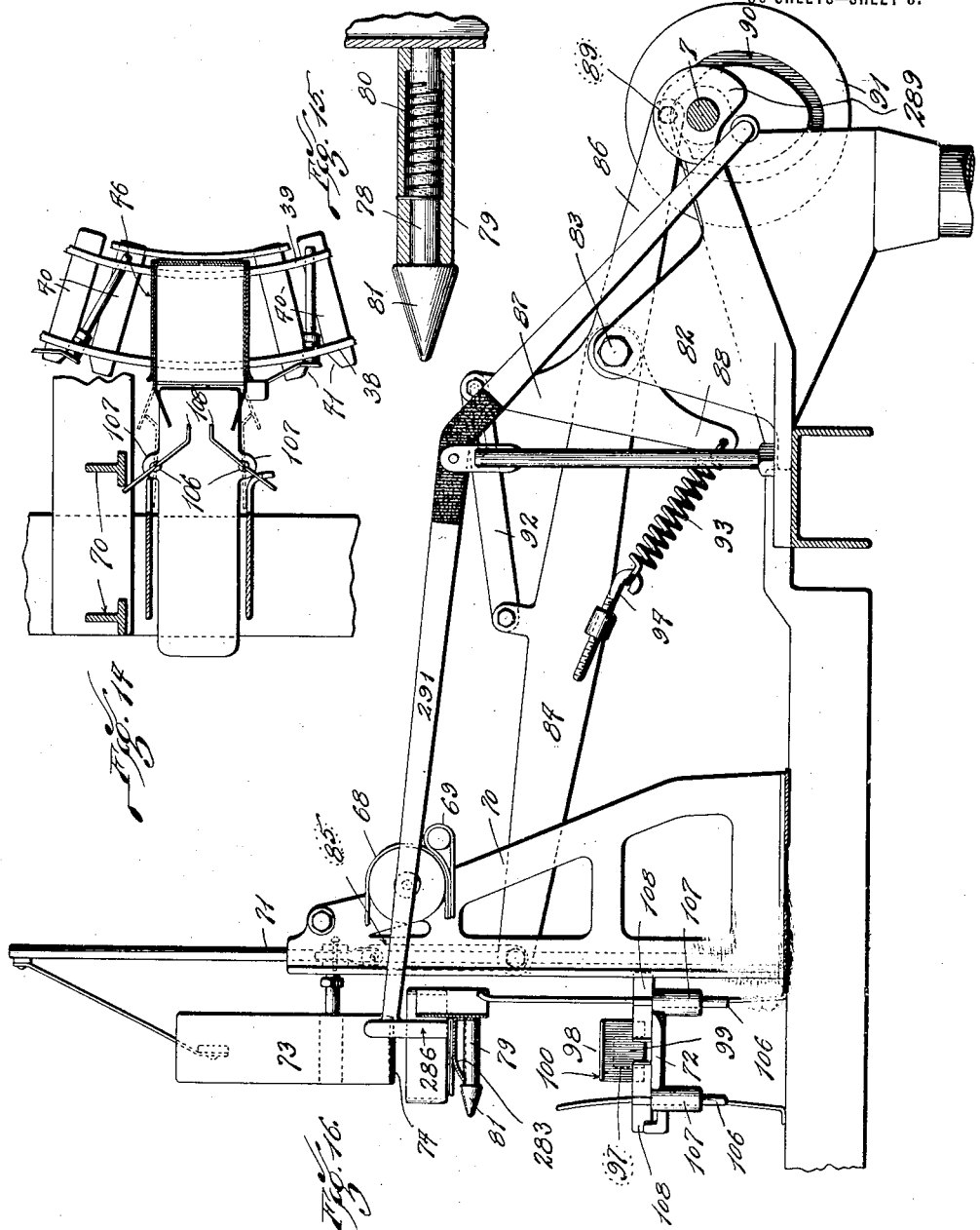

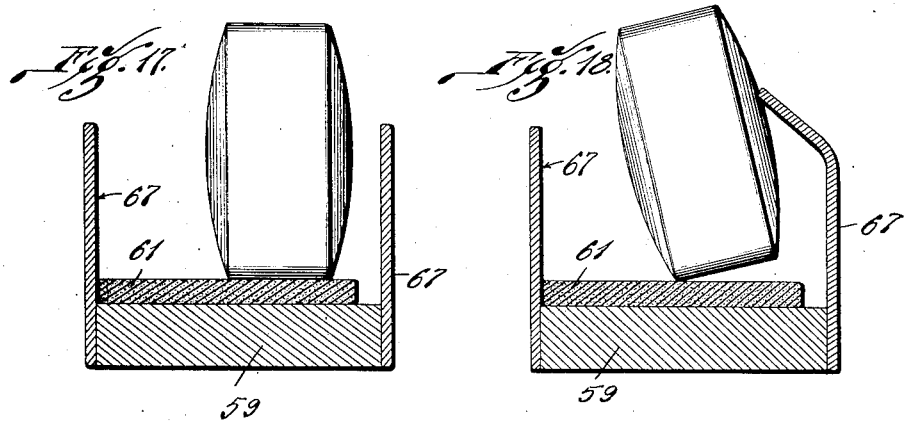

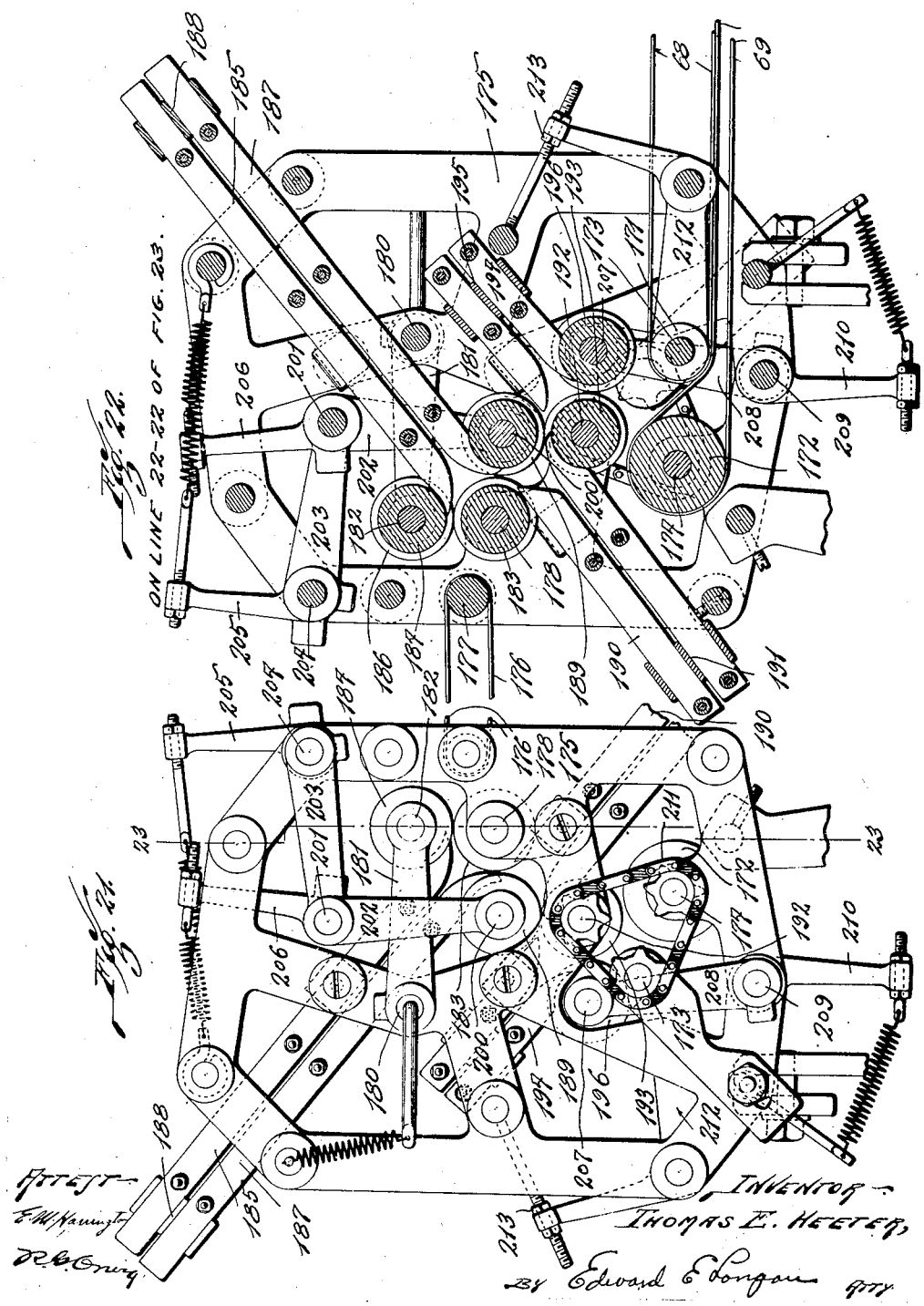

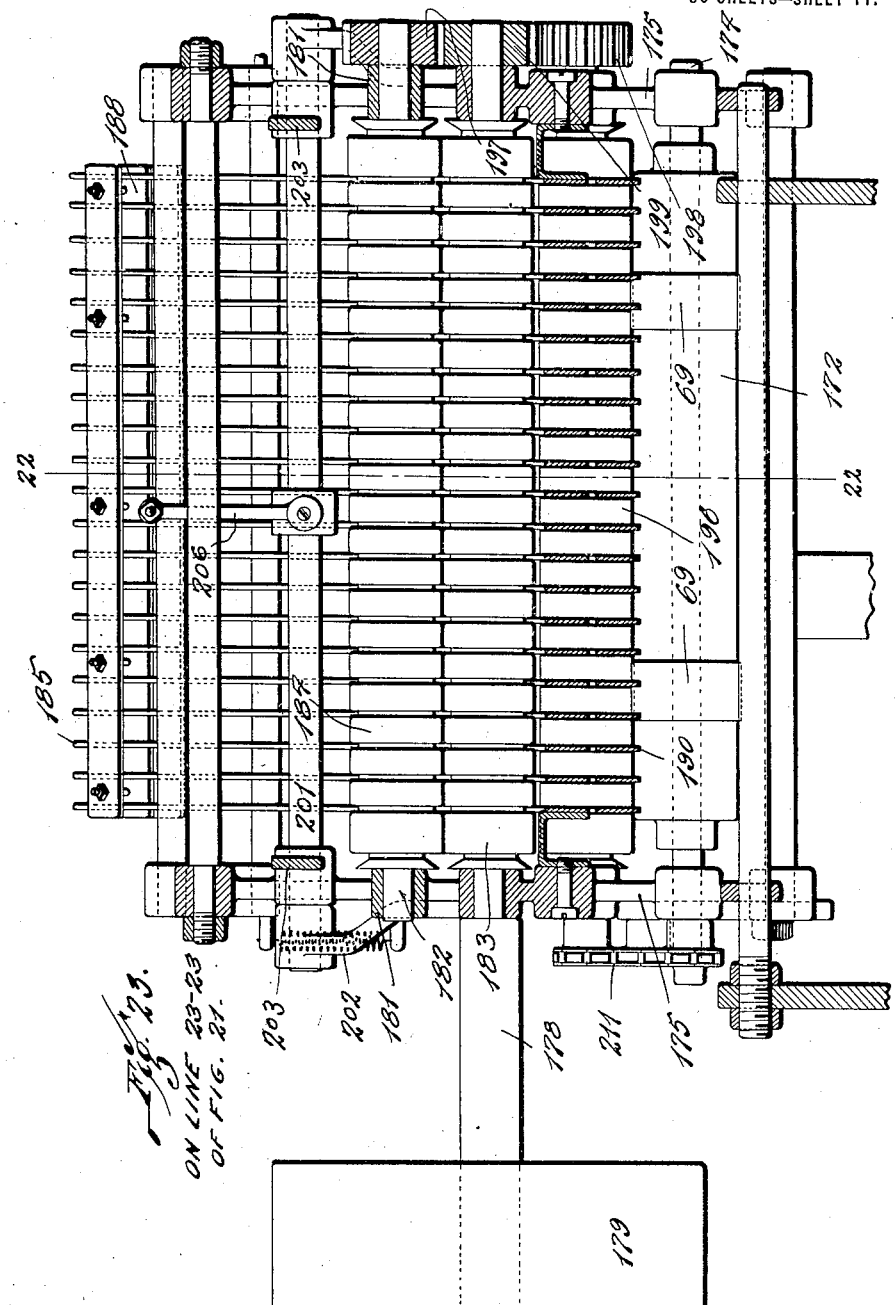

T. E. HEETER.
WRAPPING, CARTONING, AND PACKING MACHINE.
APPLICATION FILED OCT. 29, 1915.
1,336,838. Patented Apr. 13, 1920.
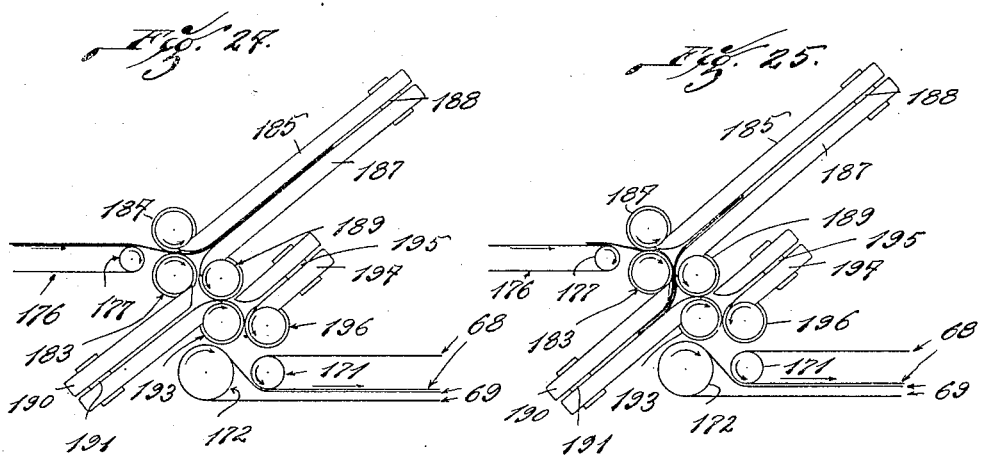
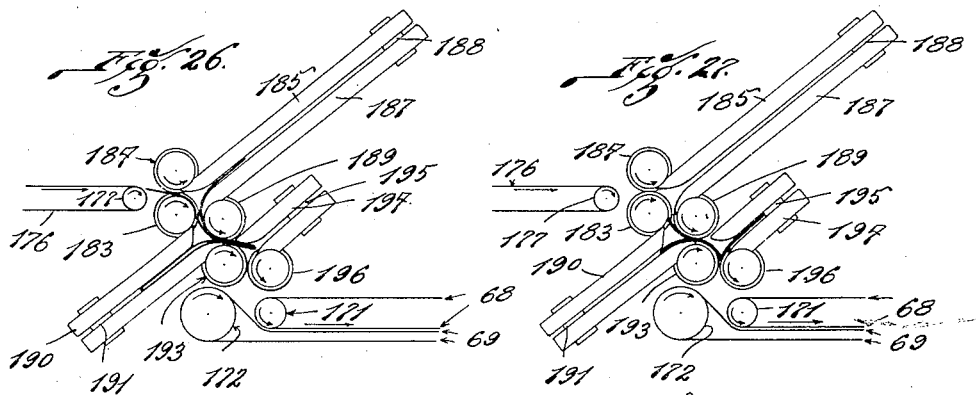

T. E. HEETER.
WRAPPING, CARTONING, AND PACKING MACHINE.
APPLICATION FILED OCT. 29, 1915.
1,336,838.
Patented Apr. 13, 1920.
30 SHEETS—SHEET 13.
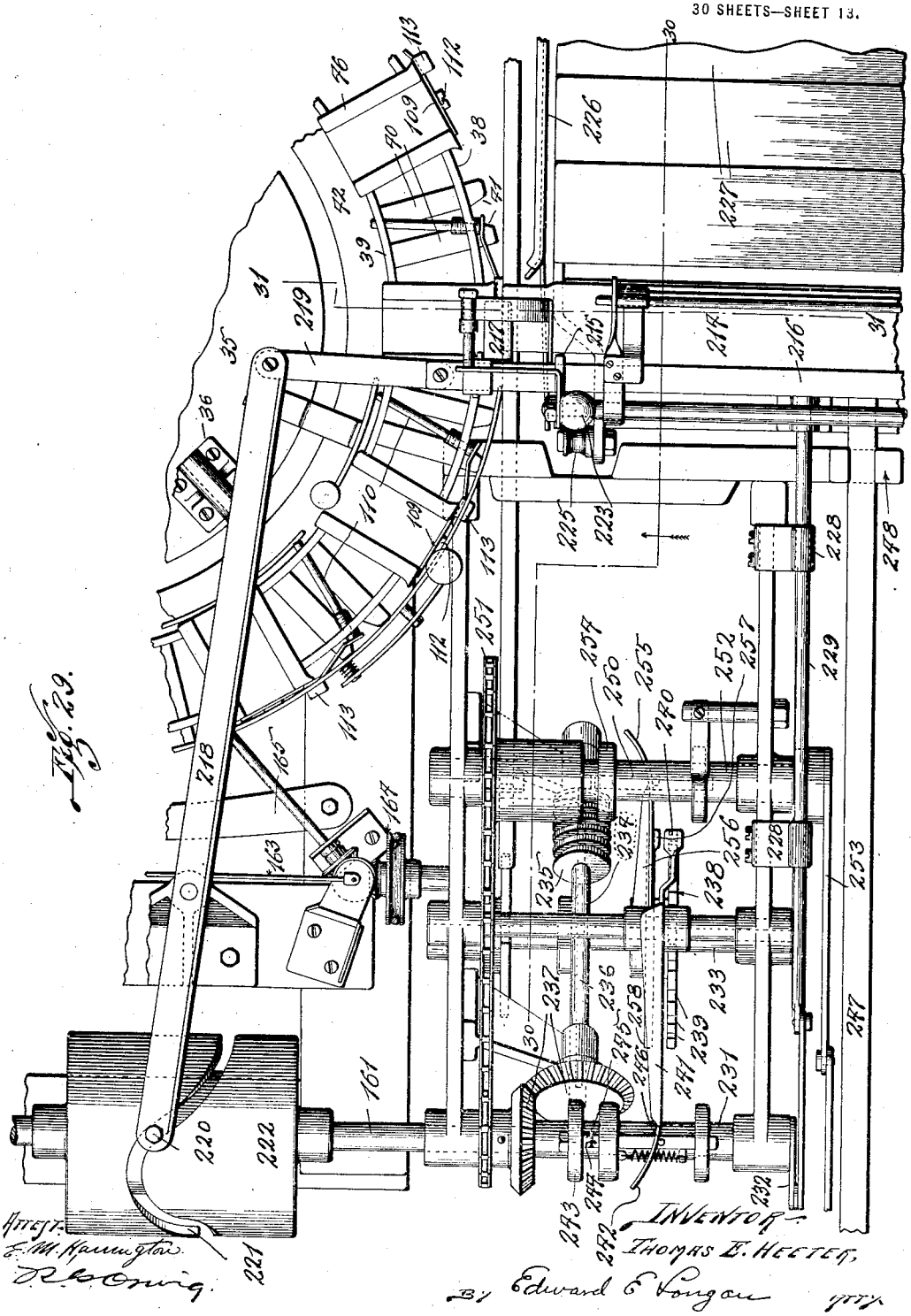

T. E. HEETER.
WRAPPING, CARTONING, AND PACKING MACHINE.
APPLICATION FILED OCT. 29, 1915.
1,336,838. Patented Apr. 13, 1920.
30 SHEETS—SHEET 14.
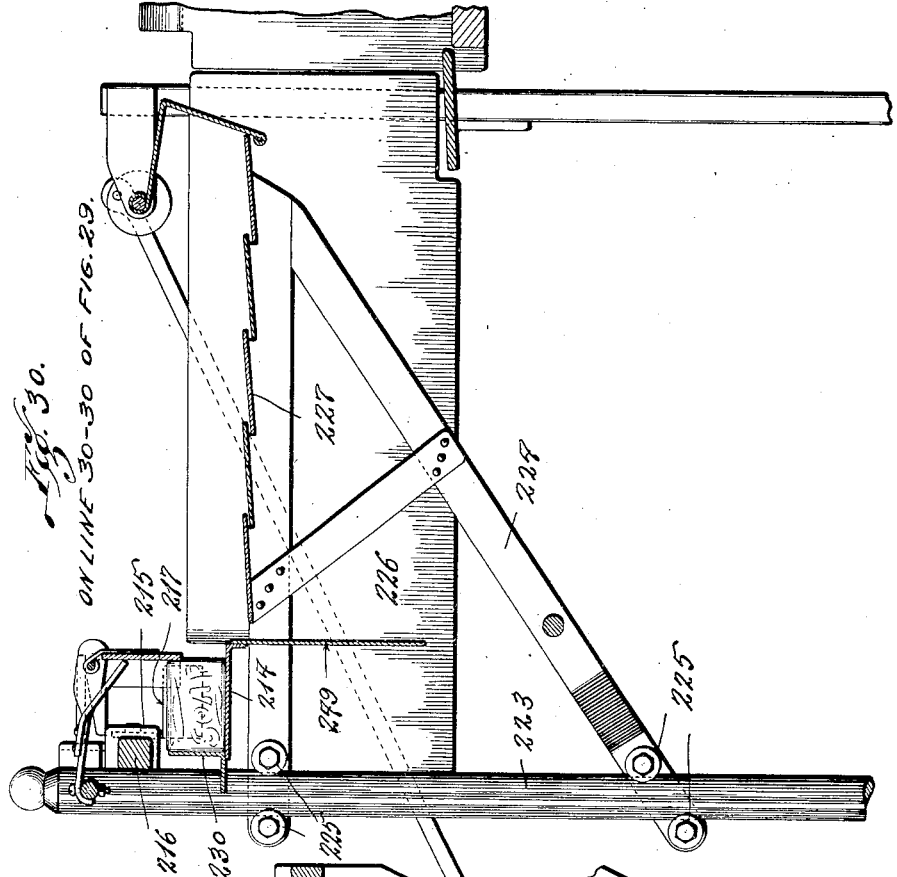
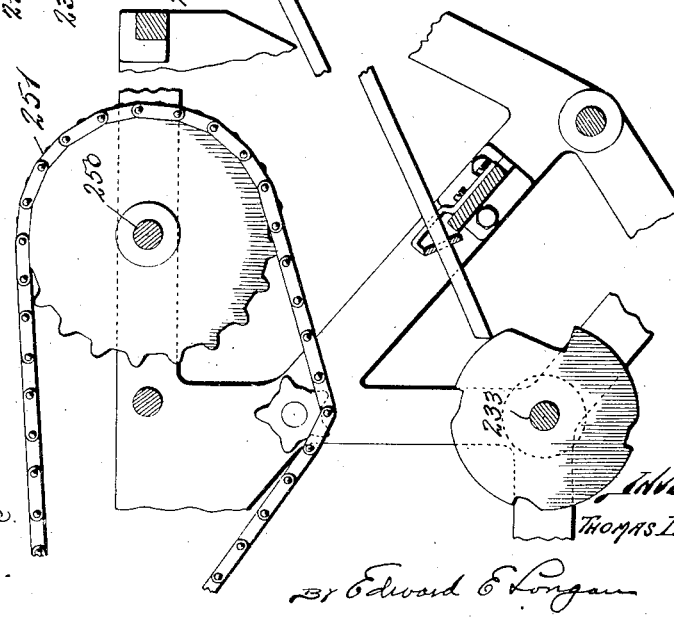

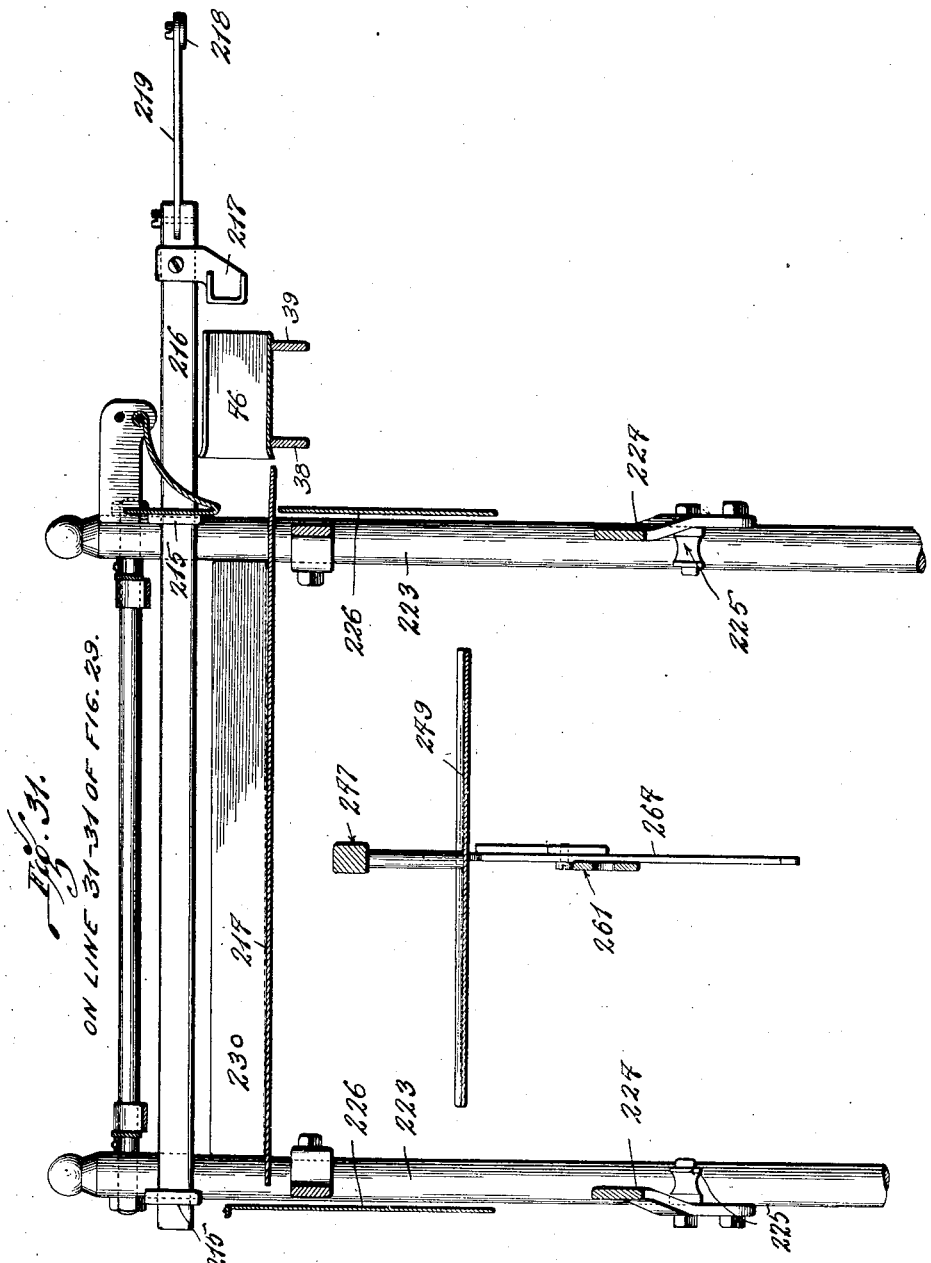

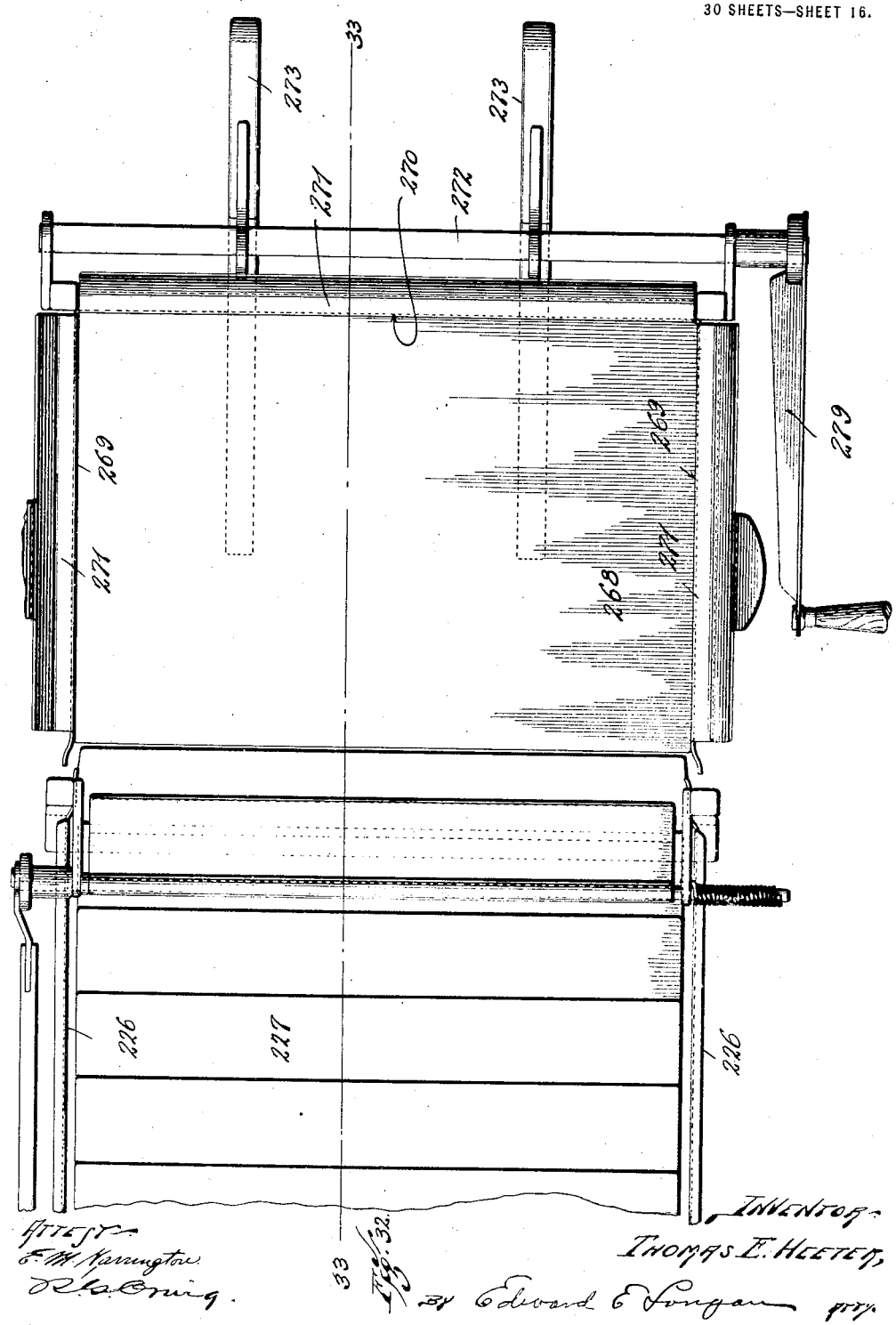

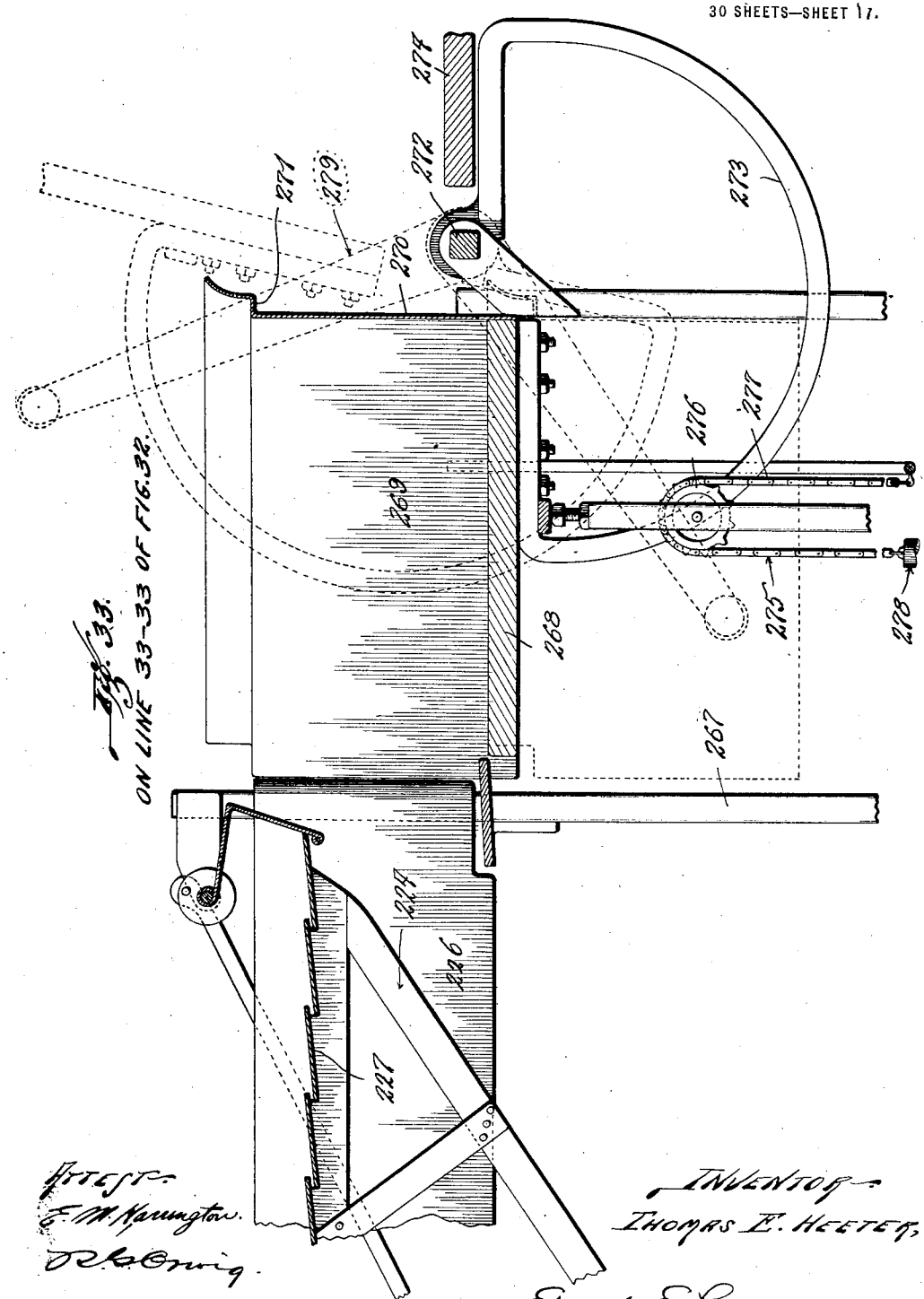

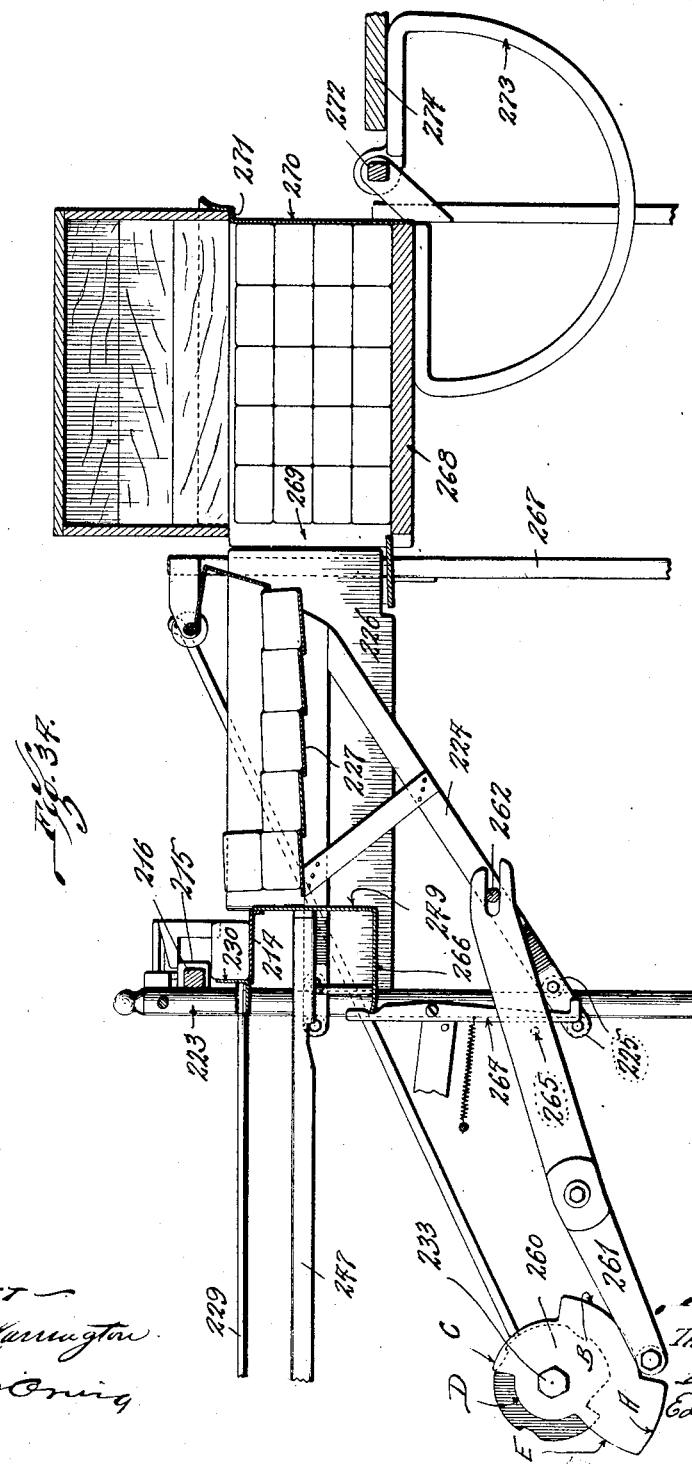

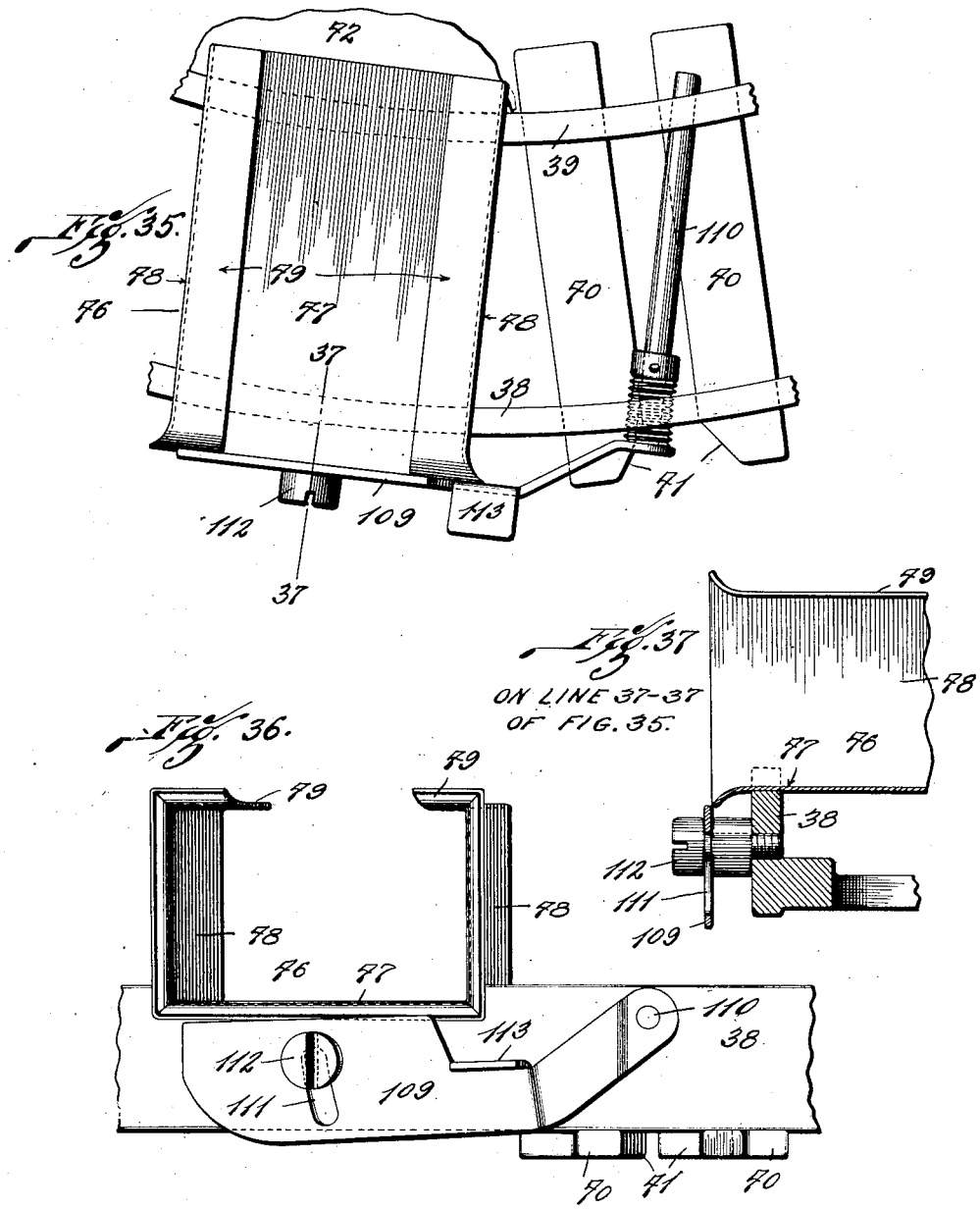

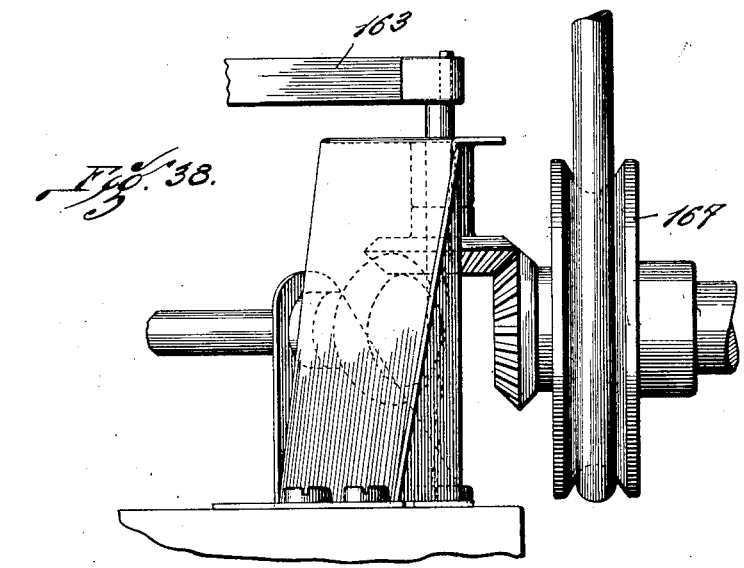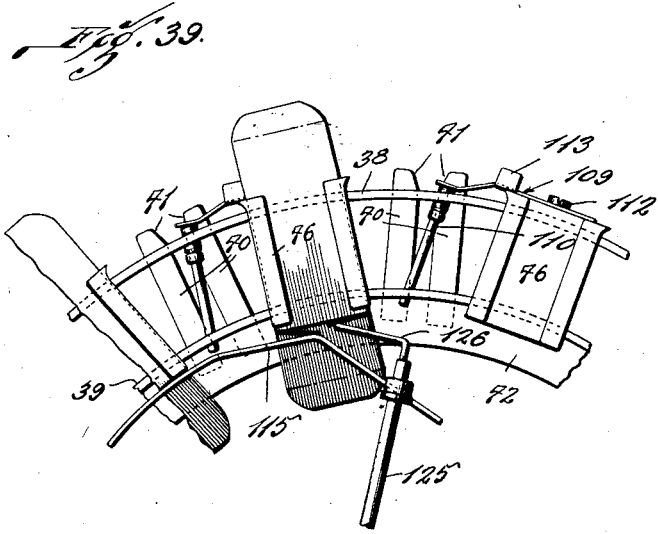

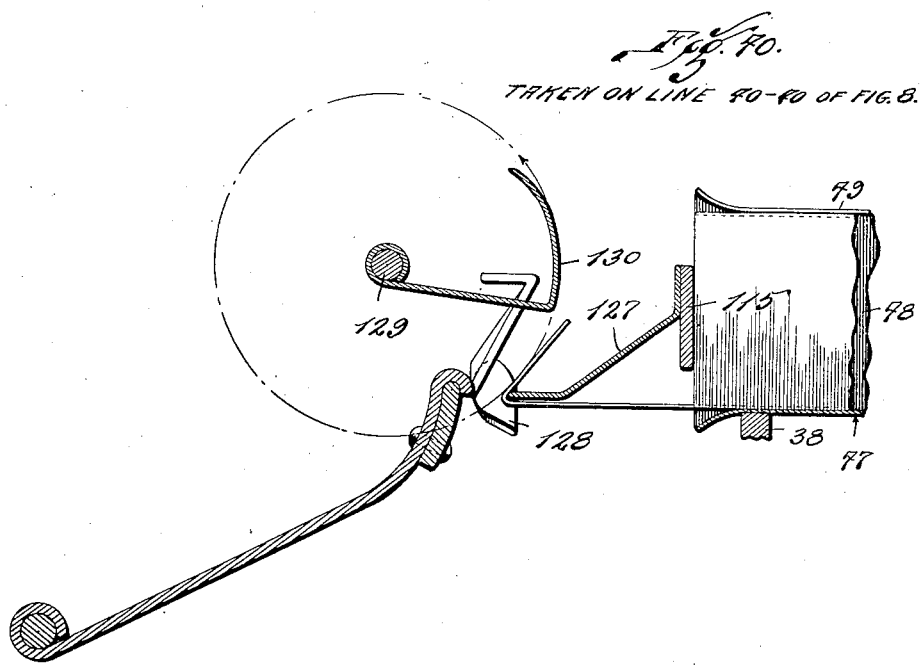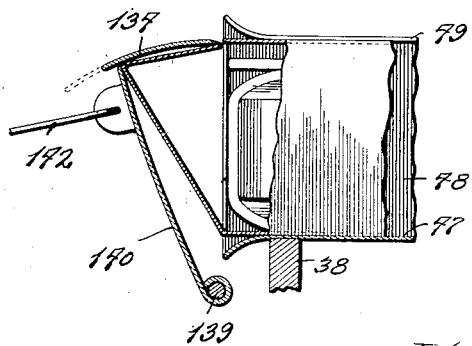

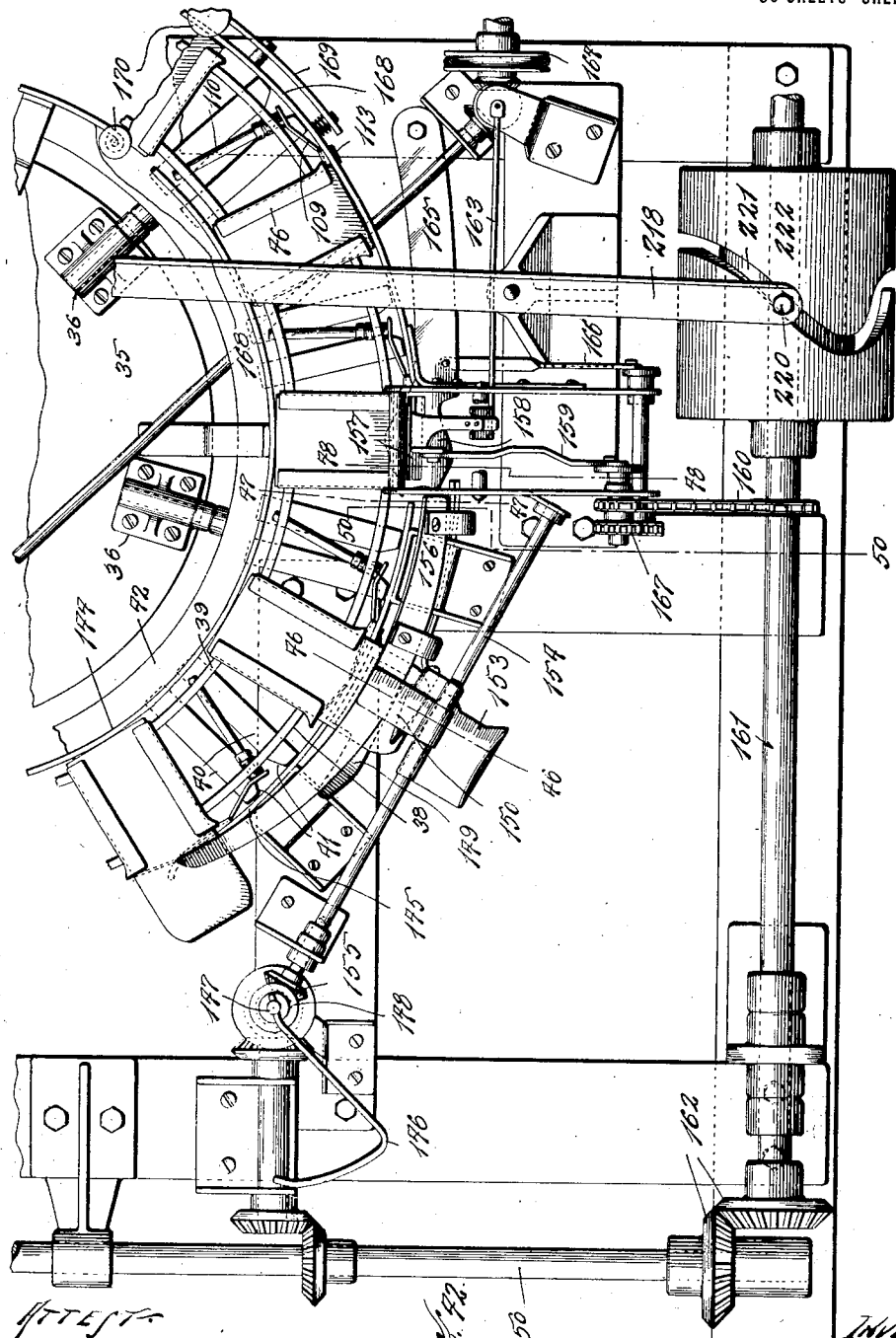

T. E. HEETER.
WRAPPING, CARTONING, AND PACKING MACHINE.
APPLICATION FILED OCT. 29, 1915.
1,336,838. Patented Apr. 13, 1920.
30 SHEETS—SHEET 23.
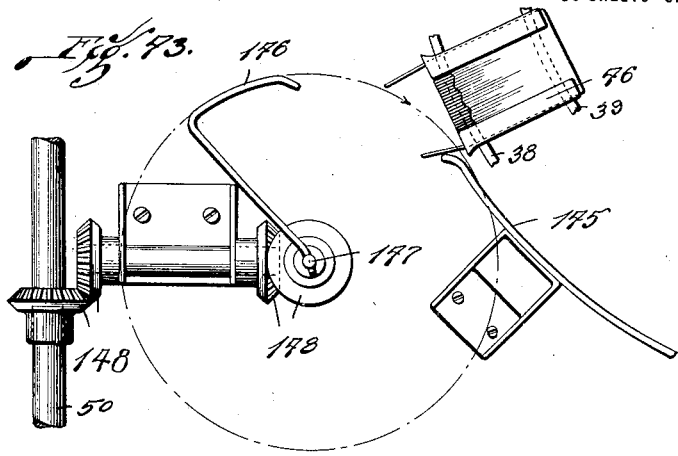
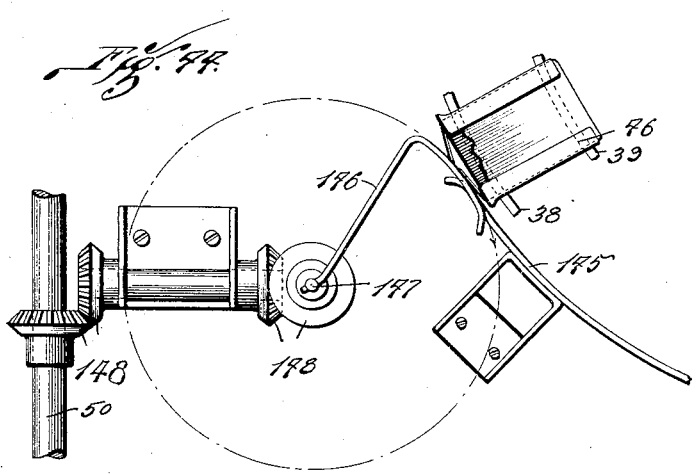
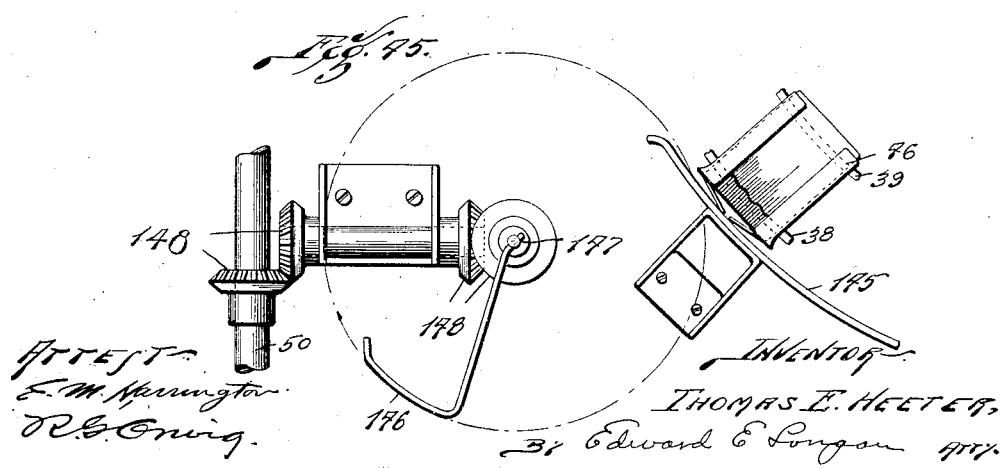

T. E. HEETER.
WRAPPING, CARTONING, AND PACKING MACHINE.
APPLICATION FILED OCT. 29, 1915.
1,336,838. Patented Apr. 13, 1920.
30 SHEETS—SHEET 24.
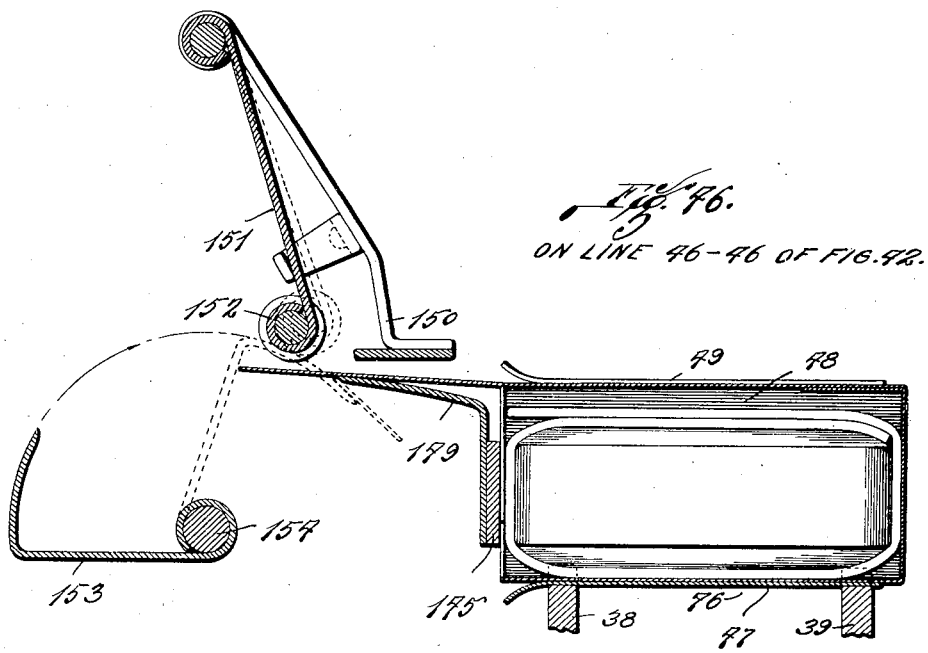
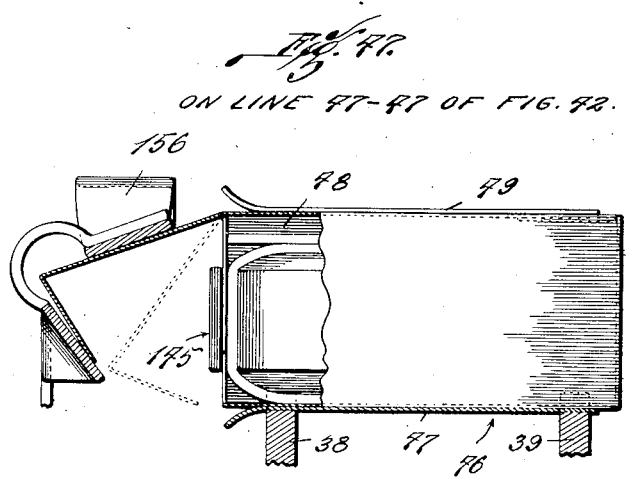

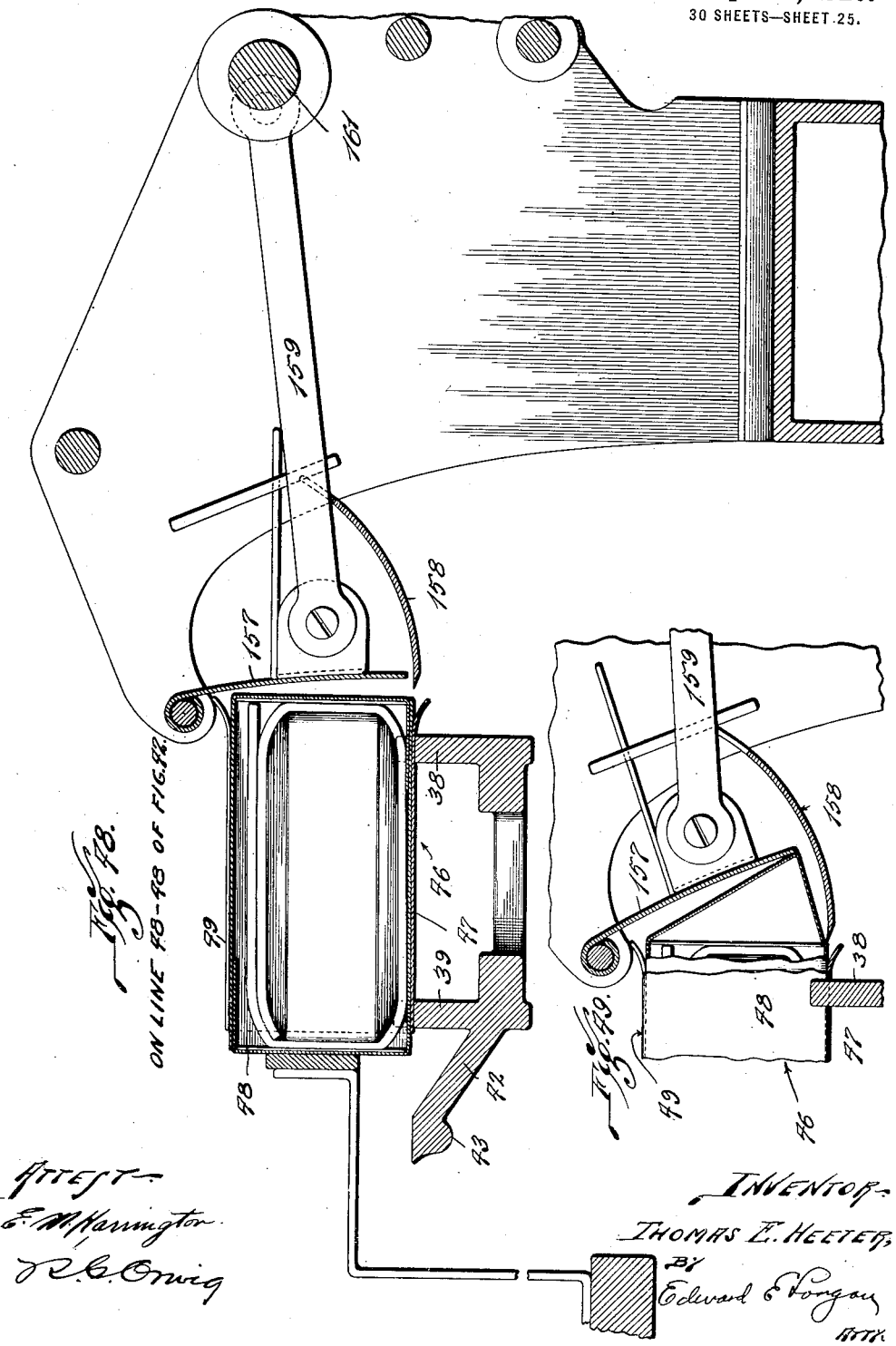

T. E. HEETER.
WRAPPING, CARTONING, AND PACKING MACHINE.
APPLICATION FILED OCT. 29, 1915.
1,336,838.  Patented Apr. 13, 1920.
30 SHEETS—SHEET 26.
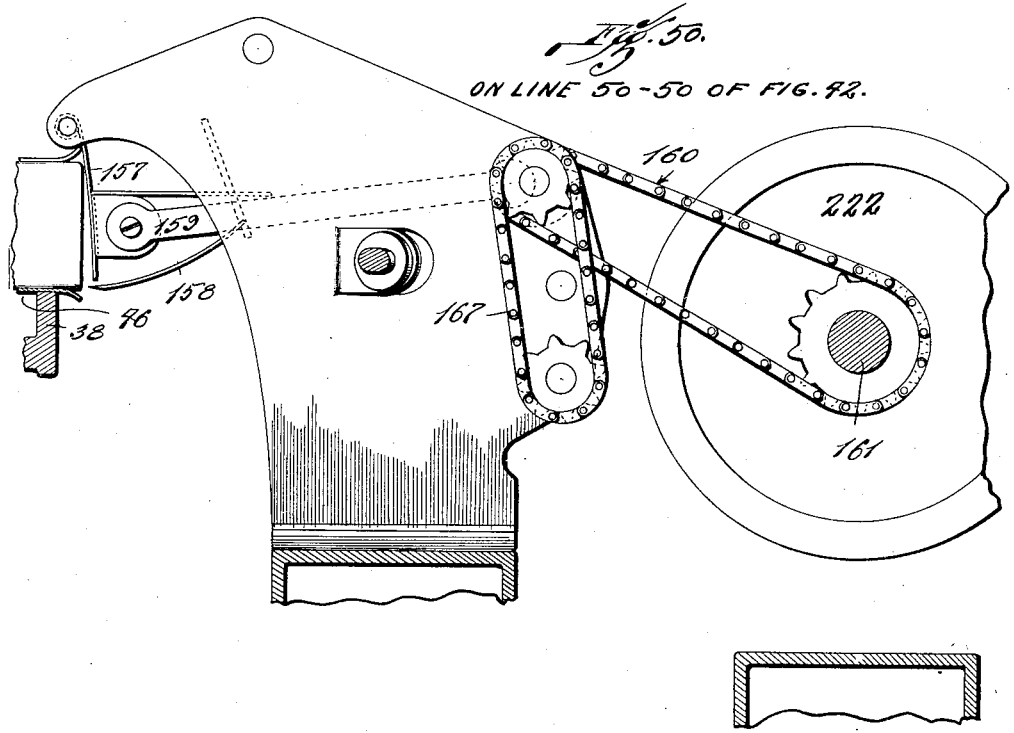
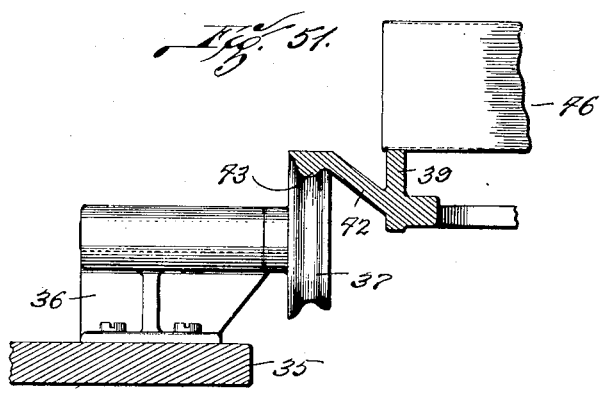
INVENTOR
Thomas E. Heeter,
By Edward E. Longan  Atty.

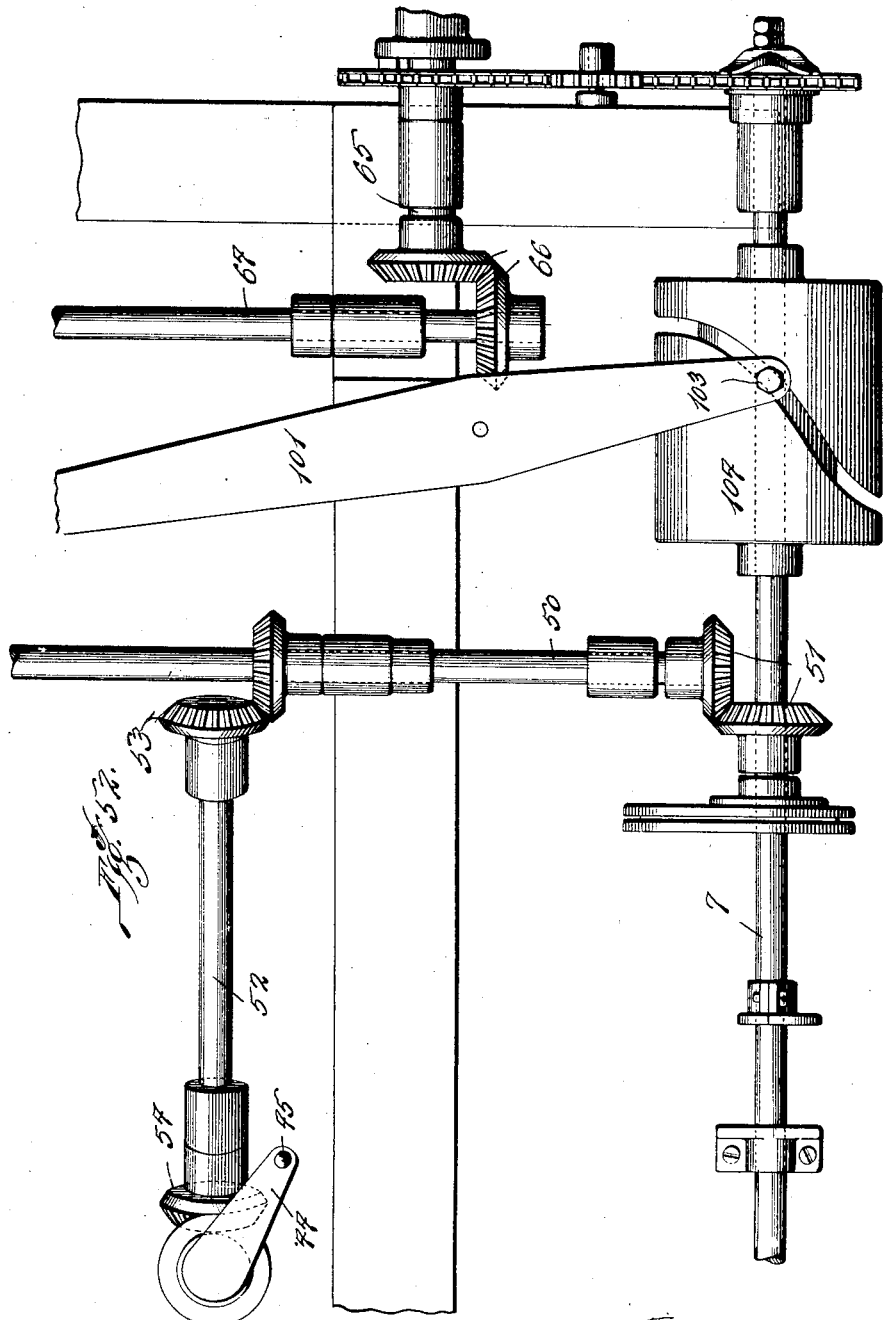

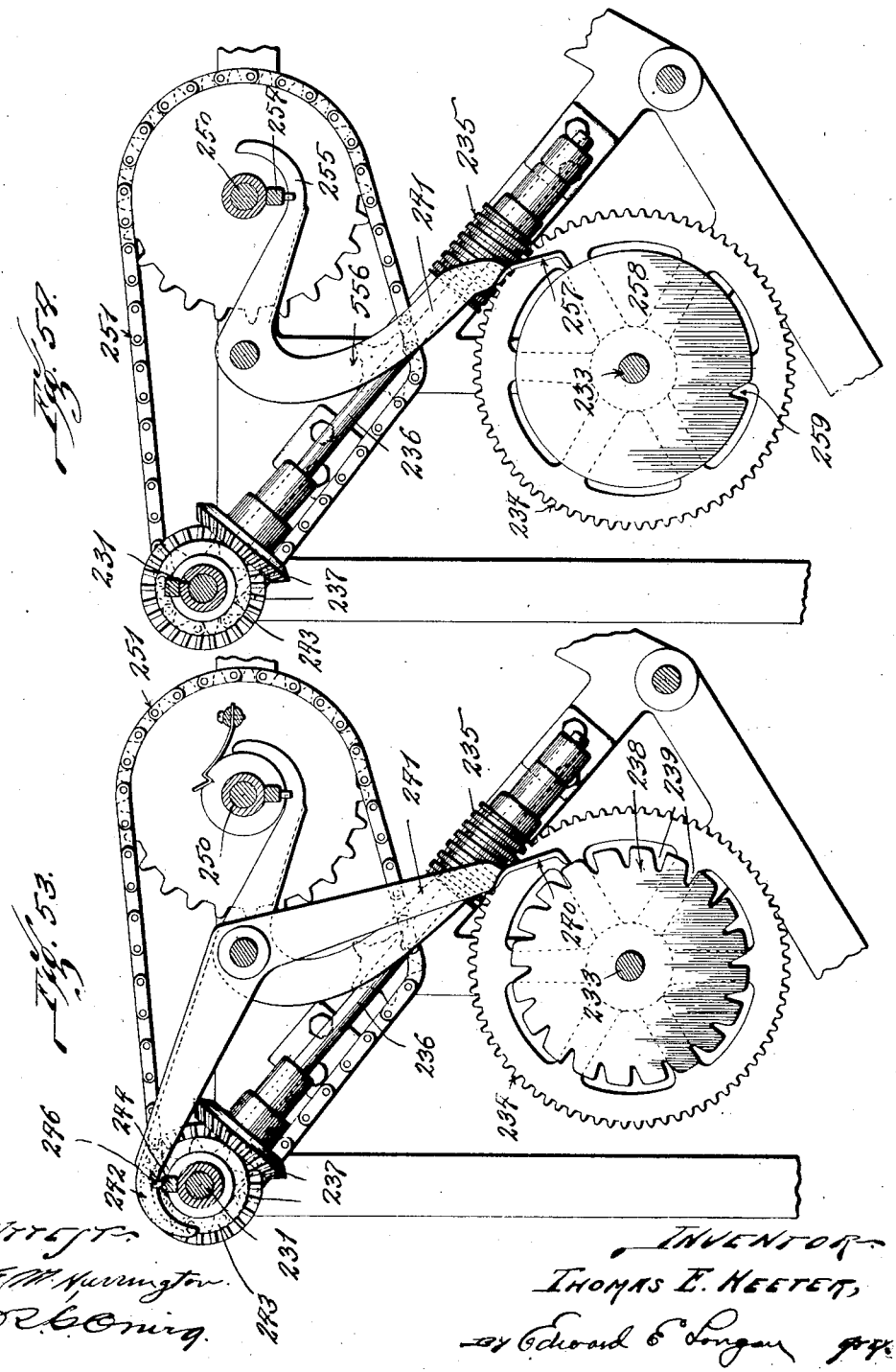

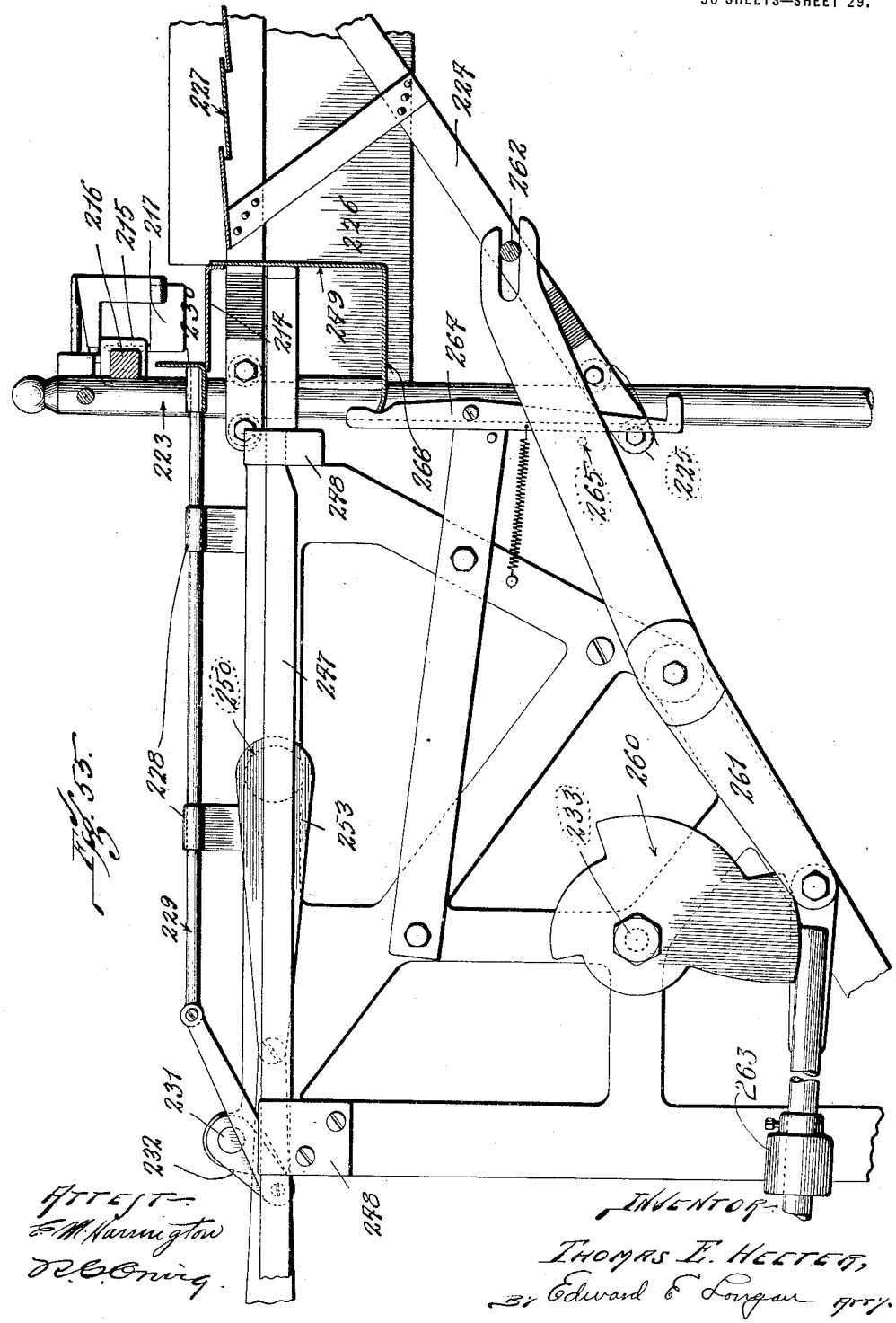

T. F. HEETER.
WRAPPING, CARTONING, AND PACKING MACHINE.
APPLICATION FILED OCT. 29, 1915.
1,336,838.
Patented Apr. 13, 1920.
30 SHEETS—SHEET 30.
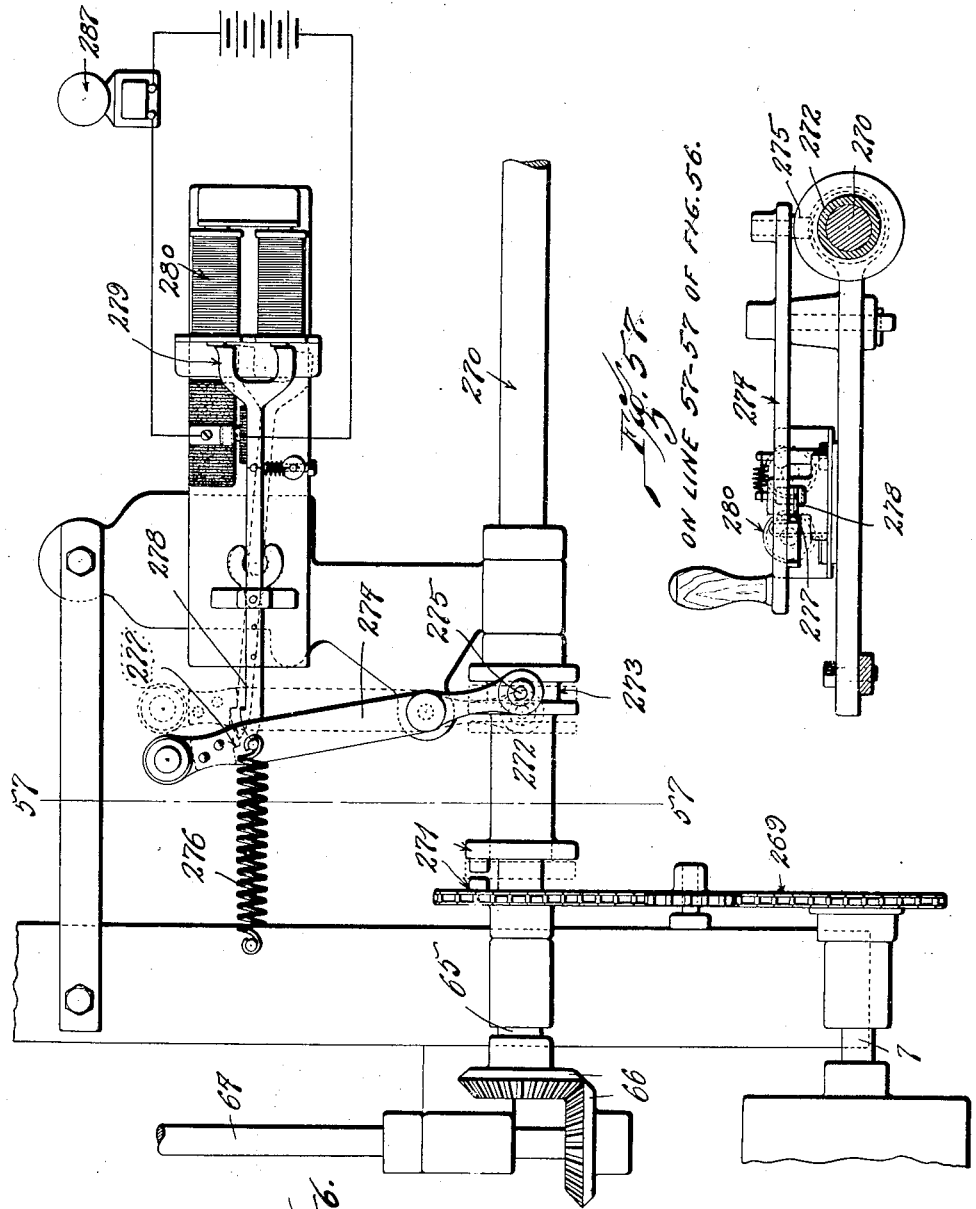

UNITED STATES PATENT OFFICE.

THOMAS E. HEETER, OF ST. LOUIS, MISSOURI, ASSIGNOR TO WM. WALTKE & COMPANY, OF ST. LOUIS, MISSOURI, A CORPORATION OF WEST VIRGINIA.

WRAPPING, CARTONING, AND PACKING MACHINE.

1,336,838.   Specification of Letters Patent.   Patented Apr. 13, 1920.

Application filed October 29, 1915. Serial No. 58,693.

*To all whom it may concern:*

Be it known that I, THOMAS E. HEETER, a citizen of the United States, and resident of St. Louis, Missouri, have invented certain new and useful Improvements in Wrapping, Cartoning, and Packing Machines, of which the following is a specification containing a full, clear, and exact description, reference being had to the accompanying drawings, forming a part hereof.

My invention relates to improvements in wrapping, cartoning and packing machines, wherein there is a carton magazine and feeding means, an article feeding means, a means for wrapping the articles, a stacking means, a conveyer relating all of said means, and means in the path of said conveyer for closing the cartons.

My improvements have for their object, the construction of a machine comprising the means just recited, whereby to economically and solely by mechanical apparatuses take a carton and an article, place the wrapped article in the carton, close the carton and count and stack the closed and filled cartons and finally box the stack of cartons.

With the foregoing object in view, my invention consists in certain novel details of construction and arrangement of parts as will be described in detail in my specification, pointed out in my claims and illustrated by the accompanying drawings, in which—

Figure 1 is a fragmentary plan of the machine showing the carton magazine, a portion of a rotary conveyer having carton holding pockets, means for feeding the cartons from the magazine to the pockets, means for holding the cartons in the pockets and means for holding the conveyer stationary during the time of feeding a carton thereto;

Fig. 2 is a detail sectional elevation showing the carton agitator and the means for preserving approximate vertical alinement of the stack of cartons;

Fig. 3 is a longitudinal sectional elevation of the carton magazine and feeding means, taken on the line 3—3 of Fig. 1;

Fig. 4 is a fragmentary sectional elevation of the carton magazine showing a single carton as held by the agitator and aliner and the carton feeding means in its initial position ready to move and open the carton;

Fig. 5 is a view similar to Fig. 4, showing the agitator dropped, the aliner withdrawn and the feeding means in a second step;

Fig. 6 is a transverse sectional elevation taken on the line 6—6 of Fig. 5, showing a wall whose function is to straighten the carton after it has been partially opened preparatory to its insertion in the carton pocket;

Fig. 7 is a view similar to Figs. 4 and 5, showing the carton fully seated in the pocket;

Fig. 8 is a fragmentary plan of the machine, showing a portion of the carton magazine and feeding means, a portion of a rotary conveyer having carton pockets thereon, means for moving and locking the conveyer, means on the conveyer for closing one end of the carton, a portion of the wrapped soap feeding means and a portion of the filled carton stacking means;

Fig. 9 is a fragmentary plan of the machine showing the soap feeding mechanism, and a portion of the rotary conveyer;

Fig. 10 is a vertical sectional elevation of the parts shown in Fig. 9, taken on a longitudinal median line;

Fig. 11 is a detail sectional elevation showing a portion of the soap feed and a conveyer pocket, and the means for positioning and partially wrapping the article for insertion in the conveyer pocket;

Fig. 12 is a view similar to Fig. 11, showing the means for completing the wrapping of the article and the means for inserting the wrapped article in a conveyer pocket;

Fig. 13 is a detail sectional elevation of the means for opening the side flaps of cartons preparatory to the insertion of the wrapped articles;

Fig. 14 is a plan, showing a portion of the conveyer, with a pocket thereon, in section, and the flap opening means;

Fig. 15 is an enlarged detail sectional elevation of the spring held soap gates;

Fig. 16 is an end elevation of the soap feeding means and its connection with power and a portion of an alarm device for indicating the proper feeding of wrappers to the article feeding means;

Figs. 17 to 20 illustrate means in the path of the article conveyer for properly positioning the articles to receive the wrappers;

Fig. 21 is an end elevation of the wrapper folding mechanism;

Fig. 22 is a sectional end elevation of the wrapper folding mechanism taken on the line 22—22 of Fig. 23.

Fig. 23 is a sectional front elevation of the wrapper folding mechanism taken on the line 23—23 of Fig. 21.

Figs. 24 to 28 are diagrammatical elevations of the wrapper folding means showing the various steps in the folding of the wrapper;

Fig. 29 is a fragmentary plan of the machine showing a portion of the conveyer, a portion of the article stacker and the means for moving the articles from the conveyer to the stacker;

Fig. 30 is a fragmental sectional elevation of the stacker taken on the line 30—30 of Fig. 29;

Fig. 31 is a transverse sectional elevation of the stacker taken on the line 31—31 of Fig. 29, showing in detail the means for moving the cartons from the conveyer to the stacker;

Fig. 32 is a plan of a portion of the stacker and the boxing means;

Fig. 33 is a sectional elevation of a portion of the stacker and the boxing means, taken on the line 33—33 of Fig. 32;

Fig. 34 is a longitudinal sectional elevation of the stacker and boxing means showing the means for raising and lowering the stacker;

Fig. 35 is a detail plan of a fragment of the conveyer showing a carton holding pocket and an automatic gate for preventing retrograde lengthwise movement of the carton in the pocket;

Fig. 36 is an end view of the carton holding pocket and gate;

Fig. 37 is a detail sectional elevation of the pocket taken on the line 37—37 of Fig. 35;

Fig. 38 is a detail elevation of the driving means for the vibrating flap holder;

Fig. 39 is a fragmental plan of a portion of the conveyer and the means for folding the first side flaps of the carton;

Fig. 40 is an enlarged sectional elevation of the first bottom flap folding means, taken on the line 40—40 of Fig. 8;

Fig. 41 is an enlarged sectional elevation of the first flap introducer taken on the line 41—41 of Fig. 8;

Fig. 42 is a fragmental plan of the machine showing the final flap folding means;

Fig. 43 is a detail plan of the final side flap folding means and a carton holder with a carton therein, the carton being partially broken away, and the parts in position to take the first step in the folding;

Fig. 44 is a view similar to Fig. 43, showing the parts in position after the two flaps have been folded.

Fig. 45 is a view similar to Figs. 43 and 44, showing the flaps folded and held;

Fig. 46 is an enlarged sectional elevation of the final end flap folding means taken on the line 46—46 of Fig. 42;

Fig. 47 is a detail sectional elevation of a guide for holding the final end flap between the time of its folding and the time of its introduction into the carton end, taken on the line 47—47 of Fig. 42;

Fig. 48 is an enlarged detail sectional elevation taken on the line 48—48 of Fig. 42, showing the final end flap introducing and closing means in positions they assume just after the performance of their functions;

Fig. 49 is a view somewhat similar to Fig. 48, showing the final end flap introducer and closer in positions during the performance of their functions;

Fig. 50 is a fragmental sectional elevation taken on the line 50—50 of Fig. 42, showing the final end flap introducer and closer and their driving means;

Fig. 51 is a detail sectional elevation showing a fragment of the rotary conveyer and one of its roller supports;

Fig. 52 is a plan showing the gear connections between the main shaft of the machine and the carton feed, the carton conveyer, the soap feed and soap conveyer and the stacker;

Fig. 53 is a detail sectional elevation showing the automatic means for controlling the movement of a predetermined number of cartons in the stacker;

Fig. 54 is a view similar to Fig. 53, showing the automatic means for controlling the movement of the entire stack of cartons;

Fig. 55 is a fragmental longitudinal sectional elevation showing the means for raising and lowering the stacker;

Fig. 56 is a plan of an automatic electrically controlled clutch mechanism between the machine as a whole and its driving shaft, together with a signal device;

Fig. 57 is a detail sectional elevation taken on the line 57—57 of Fig. 56, showing the lever for resetting the electric control and signal.

Fig. 58 is a detail elevation showing the spur and miter gear connections for operating the flap folding and inserting means (Sheet 1).

Fig. 59 is a fragmental detail elevation showing the electrical contacts at the carton conveyer (Sheet 4), and Fig. 60 is a fragmental detail elevation showing the electrical contacts in the path of the conveyer for detecting misplacement of a carton (Sheet 4).

Reference is to be had to the accompanying drawings, forming a part of this specification, in which similar figures of reference indicate corresponding parts in all the views.

The machine, as a whole, comprises a rotary conveyer, carrying pockets into which cartons are introduced and held, a magazine for holding cartons, means for selecting cartons, one at a time, from the magazine, opening and introducing the selected cartons into the pockets on the conveyer, means on the conveyer for first closing the flaps at one of the ends of the cartons, means for wrapping articles, (the article shown being a cake of soap and the wrapper being an advertising sheet) means for introducing the wrapped articles into the cartons, means for closing the flaps at the other ends of the cartons, means for stacking a predetermined number of the filled and closed cartons and finally a means for boxing the stack of filled cartons;

*The carton selecting and feeding means.*

This means is illustrated in Figs. 1 to 8 of the drawings and comprises a table 1, arising from which table are the walls 2, 3, 4 and 5, the walls 2 and 4 being side walls and the walls 3 and 5 being the front and rear walls respectively of the magazine. 6 designates the bottom of the magazine, which only partially closes the bottom of the magazine and extends only part of the length thereof, and is by preference an integral part of the side wall 4.

Each of the walls 2, 3, 4 and 5 have their uppermost ends flared upwardly and outwardly in order to facilitate the feeding of cartons to the magazine and in plan these walls are shaped and relatively arranged to conform with the cartons used. The drawings show a magazine designed for use in connection wth a carton, whose specific construction forms no part of my invention, constructed from a single blank of material, the body of which carton comprises a rectangular oblong, scored to produce relatively articulable carton sides and top and bottom, the top and bottom having end flaps at opposite ends, and the carton sides each having side flaps at each end. These cartons are supplied to the magazine in "the flat", that is folded, as shown in Fig. 4, wherein only one carton is shown, but it is to be understood the magazine is designed to hold a number of such folded cartons, and when the machine is in operation the magazine should be filled with cartons.

Extended beneath the magazine and having its end journaled in the table 1 is a shaft 7, rotatable by a means hereinafter described, and upon which there is secured for rotation therewith a cam 8, whose peripheral face operates a rocking arm 9, the outer free end of which carries a pin 10, which pin traverses an arcuate slot 11 in the wall of the magazine, and which pin 10 engages and lifts the free end of a pivoted carton support and agitator 12, which normally occupies a position opposite, but in the same plane as the bottom 6 of the magazine.

This support and agitator 12 is moved by gravity to tilt its free end downwardly and forwardly, so that the lowermost carton may be directed to the table 1 in advance of the magazine and the support and agitator is abruptly elevated by the cam 8 and lever 9 thereby agitating the stack of cartons which tends to keep the cartons separated from each other and causes the stack to settle uniformly in the magazine.

The top of the table extends both forwardly and rearwardly beyond the carton magazine. Beneath and rearwardly of the magazine the width of the top approximates the width of the magazine and forwardly of the magazine its width varies from the width of the magazine which is likewise the width of the carton in the flat to a width approximating the width of a carton in an open condition ready to receive an article. The one margin of the table top forwardly of the magazine parallels and forms a straight continuity of the same margin of the balance of the top while the opposite margin of said forward end of the top is inclined inwardly and forwardly.

Along each of the margins of the forward end of the table top is a vertical wall 13, whose upper ends bear flanges 14, overhanging the table top, and between which the cartons are moved to shape them into true rectangular, open, formation for insertion into a receiving pocket, hereinafter described.

In parallelism with the table top and in a plane thereabove, rearwardly of the magazine is a slide bar 15, carrying a cross head 16, which cross head is reciprocated by a crank 17 carried by the shaft 7 and a link 18 between said crank and cross head.

Extending laterally from the cross head, over the table top, is a stub-shaft 19, and secured to the stub-shaft to reciprocate therewith is a rod 20, traversing a guide 21, to maintain it in alinement with the magazine.

At the forward end of the rod 20 there is secured a plate 22 whose side margins converge toward its forward end to facilitate its insertion into the lowermost "flat" carton in the stack held by the magazine and carries on its back or top surface a fin 23 whose function is to partially open the carton.

At the heel or rear end of the plate, vertically spaced therefrom is a hook 24 arranged to engage the rear margin of the carton to advance it over the table top and between the walls 13 and therebeyond.

The carton partially opened by the plate 22 and its fin 23 in being advanced through the walls 13 is fully opened and "squared".

The plate 22 and hook 24 are combined as a unit and are pivotally secured to the rod 20 so that they may articulate relative to the rod, and in order that this unitary structure may be freely moved over its supporting surface, I provide a roller 25.

Over the table top from a point beneath the magazine to a point rearwardly thereof I mount a ramp 26 which inclines downwardly and forwardly, which serves to raise and lower the plate 22, to the plane of the lowermost carton in the stack, when it stands to the rear of the magazine and to a plane beneath the top of a fully opened carton when it stands forwardly of the magazine. This step is made necessary by the presence of the agitator 12, but by it I secure a very decided advantage which is the bodily tilting of the plate, its fin and hook downwardly and forwardly during their advancement to permit the carton to ride beneath the flanges 14 of the tapered walls 13, which flanges and walls incline downwardly and forwardly to assist the opening and squaring of the carton.

While the plate 22 and fin 23 directly engage and move but the lowermost carton, the superposed cartons may be drawn forwardly by said lowermost carton and to obviate this to produce consecutive single, carton deliveries, I mount in advance of the magazine a gate 27, vertically swung on a shaft 28 to extend across the forward ends of the lowermost cartons in the stack. On one end of this shaft 28 there is a crank 29 having connected therewith a spring 30 which normally tends to hold the gate against the cartons to hold them in relative vertical alinement. On the shaft 7 next the cam 8 is a cam 31 whose periphery engages and rocks a lever 32 connected with the crank 29 of the gate by a link 33. The cams 8 and 31 are so shaped and relatively disposed on the shaft 7 to raise the agitator 12 and swing the gate 27 to open position during the time of the delivery of a carton from the magazine.

The cam 31 is so shaped to quickly release the rock lever 32 after the gate has been moved to full open position to permit the spring 30 to move the gate with pressure against the cartons in the stack to establish and maintain their vertical alinement. By preference the gate 27 has at its lowermost margin an inturned hook 34 which will catch the forward margin of the carton, next adjacent the carton being positively moved, and retain or hold it within the magazine.

*The carton conveyer.*

This conveyer is best illustrated in Figs. 1, 8, 35, 36, 37, 51 and 52 and comprises a fixed support 35, whose top is preferably a circular bed having at its periphery the spaced brackets 36, illustrated in detail in Fig. 51 in each of which is journaled a flanged roller 37, which rollers 37 constitute the support of the conveyer.

The conveyer body comprises a pair of concentric rings 38 and 39 connected by the uniformly spaced pairs of ties 40, which are radially arranged and whose outer ends project beyond the outer ring 38, and which projecting ends are chamfered to produce spaced teeth 41.

The innermost ring 39 of the conveyer body carries a flange 42 having a rib 43 which fits the flanged rollers 37.

Intermittent rotary motion is imparted to the conveyer by means of a driven crank 44 whose pin 45 rides between a pair of the ties 40 and moves them a distance equivalent to the spacing of the pairs of ties, from center to center between the pairs of ties. That is, in each cycle of its movement the crank moves the entire carrier a distance equal to the spacing of the pairs of ties.

As shown in Figs. 36 and 37, the upper faces of the rings 38 and 39 are notched at points between the pairs of ties 40 whereby to position and hold the carton pockets 46, each of which comprises a bottom 47 whose width is substantially the width of the carton when in an open condition, opposite side walls 48 arising vertically from the bottom and of the same length as the bottom, which dimension is somewhat less than the length of the carton body, not including its flaps, and a top flange 49 paralleling the bottom and projecting inwardly from the side walls.

In order to facilitate the insertion of the cartons, the outer ends of the bottom and the side walls of the pocket are flared outwardly, and in order that the cartons are brought to the various positions throughout their path in time with the various operations thereon, the pockets are spaced from center to center the same as the spacing of the ties 40.

The bottoms of the pockets 46 are in the plane of the forward extremity of the table top 1, and the lateral spacing of the side walls of the pockets is substantially the same as the spacing of the walls of the table top, so that the singly selected and opened cartons may be fed into the pockets, whose walls hold the cartons fully open.

In order to time the conveyer movements to the movements of the mechanism which feeds cartons to the pockets of the conveyer I employ a shaft 50 having a miter gear connection 51 with the shaft 7, which shaft 7 drives the carton feeding mechanism, and a shaft 52 having a miter gear connection 53 with the shaft 50 and a miter gear connection 54 with the shaft bearing the crank 44 which moves the conveyer.

To positively lock the conveyer against movement in either direction, between the times of its movements, by the crank 44, and to hold it in positions with its pockets registering with the feeding means and the various succeeding means acting on the cartons, I employ a pawl 55 in the form of a bell crank, whose one end engages and fits between the teeth 41 and whose other end carries a roller 56 in engagement with a cam 57 carried by the shaft 7. This cam engages the roller and moves the pawl to free it from the teeth 41 of the conveyer when the conveyer is moved and the cam releases the pawl, after the movement of the conveyer, so that the spring 58 will hold the pawl in locking position.

To limit the movement of the pawl 55 to prevent its being wedged between the teeth of the rotary conveyer, I arrange a stop, secured to the table of the carton feed, which stop engages the outer arm of the bell crank shaped pawl.

*The soap feeding and wrapping mechanism.*

This mechanism is illustrated in Figs. 8, 9, 10, 11, 12, 13, 14, 15, 16, 17, 18, 19, 20 and 52, and comprises generally a conveyer for the soap or article, a conveyer for the wrapper or advertising matter, a press for selecting and moving the article from its conveyer to the plane of its receiving pocket on the rotary conveyer and for partially wrapping the article and a ram for completing the wrapping operation and inserting the wrapped article into a carton carried on the rotary conveyer.

As shown in Figs. 8 and 9, the soap conveyer extends outwardly from the rotary conveyer at an angle of substantially ninety degrees relative to the table of the carton feeding means and consists of a table 59, extending between the rotary conveyer and a soap caking or forming machine, not shown.

Mounted on pulleys 60 beneath the top of the table 59 is an endless belt 61 which is partially supported over the table top and driven in a direction toward the rotary conveyer, by means of a shaft 62, having a sprocket connection 63 with a shaft 64, which shaft is connected with the main shaft 65 by a miter gear connection 66.

The cake forming means is of the type wherein the partially formed pieces of soap are supplied to shaping dies while standing on their sides, and which feeds the completely formed cakes in this position to the conveyer. Upstanding from the table top on each side of the belt is a wall 67 between which the cakes of soap are directed to the press. One of these walls 67 has its upper end turned to overlie the belt, as shown in Figs. 17, 18, 19 and 20, whereby to engage the advancing cakes of soap to cause them to be turned to lie flatwise upon the belt, to be in substantially the same position as the carton pocket on the rotary conveyer.

Extending from a paper folding machine, to be hereinafter explained, and as shown in Fig. 22, to and beyond the soap press, and on either side thereof as shown in Figs. 9 and 16, are a pair of endless belts 68 and 69, driven in a direction toward the press to carry therebetween the folded wrappers to the cakes of soap and the press.

Secured to the machine frame near the end of the soap conveyer is a frame 70 comprising guides 71 which are vertically disposed between the pairs of belts 68 and 69 comprising the wrapper conveyer. Near the base of the frame 70 in a plane beneath the two belt conveyers and in the plane of the carton pockets on the rotary conveyer is the bed plate 72.

Mounted between the guides 71 is a reciprocable head 73 whose lowermost face 74 approximates the shape of the cake of soap, so that when it is lowered it will move with it but one cake of soap as supplied by the soap conveyer.

Secured to the press frame in line with the discharging end of the soap conveyer is a chute 75 comprising side walls and a bottom 76 which bottom extends only a portion of its length, terminating short of the path of the press head, and which chute serves to properly position the cakes of soap in the press. Extending across the chute beyond the path of the press head is a roller 77, which serves as a stop for the cakes of soap to prevent their movements beyond the path of the press head.

Secured to the chute, transversely thereof, in a plane beneath the bottom thereof and on either side of the path of the press head is a stub shaft 78, on each of which is swung a gate 79, which are acted upon by springs 80 to stand in the path of the press head to constitute a support for the cake of soap during the time the wrapper is introduced between the soap and gates.

Each of the stub shafts 78 supporting the soap gates 79 is provided with a conical head 81, which elevate the folded wrappers so that they may be moved over the gates.

On the machine frame, in line with and rearwardly removed from the press frame, is a bearing 82, supporting a shaft 83 on which is pivotally mounted a lever 84, connected by a link 85 with the press head, as shown in Fig. 16. Mounted to rock on the shaft 83, independently of the lever 84, is a lever 86, having at its one end the opposite laterals 87 and 88, and at its other end a pin 89, which rides in a groove 90 of a cam 91 carried by the shaft 7.

The lateral 87 of the lever 86 is connected with the lever 84 by means of a rigid link 92, while the lateral 88 of the lever 86 connects with the lever 84 by means of a contractile coil spring 93, whose tension is variable by means of the adjustable hook 94 carried by the lever 84.

By this arrangement I provide a connection between the operating cam 91 and the press head which will yield in the event of an overload of the press head, for instance, a number of wrappers.

The cam 91 is so disposed as to move the press head downwardly during the time the rotary conveyer is locked against rotation. But it is to be understood that the press head movement occupies only a portion of the time in which the rotary conveyer is stopped, so that the soap ram may operate immediately following the operation of the press head.

Supported in guides 96 beneath and paralleling the soap conveyer is a stem 97 carrying at its one end a ram 98 comprising a rear wall 99 secured to the end of the stem 97 and a forward overhanging wall 100, as shown in Figs. 10, 11 and 12.

For the movement of the soap ram I arrange on the machine frame a rocking lever 101, secured at its one end to the stem of the ram by a link 102 and carrying at its other end a pin follower 103, which rides a grooved cam 104 mounted on the shaft 7.

Fig. 11 shows the ram at its inner limit of movement where its forward overhanging wall 100 serves to turn to a substantially vertical position the one end of the wrapper projecting beyond the cake of soap as the press head lowers them to the bed plate 72. To turn to a vertical position the opposite projecting end of the wrapper I arrange a cross piece 105, which as shown in Figs. 11 and 12 serves also to hold elevated the top flaps of the carton while the soap and wrapper are being inserted.

The outer limit of movement of the soap ram is within a carton on the rotary conveyer, and during the movement of the ram the wrapper is completely folded about the cake of soap, the overhanging plate bringing the one end of the wrapper to overlie the soap and the cross piece and carton bringing the other wrapper end to overlie the first folded end of the wrapper.

In Figs. 13 and 14 I illustrate in detail a means for spreading the side flaps of the carton beyond the path of movement of the ram, which comprises a spring actuated shaft 106 vertically mounted in bearings 107 formed in the bed plate contiguous to each side margin thereof between the path of the press head and the pockets carried by the rotary conveyer.

On each of these spring actuated shafts is a blade 108 which normally stands diagonally of the bed plate, with one end of each blade standing inside of a side flap of the carton, as shown in Fig. 14, from which position the blades are moved by the piece of soap to the position, shown by dotted lines, holding the side flaps of the carton outwardly beyond the path of the soap and wrapper.

*The carton closing mechanism.*

This mechanism is arranged in two distinct groups, the one group acting on the cartons between the carton feeding means and the soap and wrapper feeding means, and the other group acting on the cartons after the soap and wrappers have been placed in the cartons.

The first group is illustrated in Figs. 8, 35, 36, 37, 38, 39, 40 and 41 and comprises a plate 109 movable across the outer open end of each carton pocket on the rotary conveyer, each of which is mounted on a shaft 110, rotatably mounted in the rings of the conveyer body, which shafts are disposed in parallelism with the carton pockets, whereby the plates 109 will swing thereon in line with the outer ends of the pockets, and as shown in Fig. 36, each plate 109 is provided with a slot 111 near its free end through which are extended the set screws 112 which seat into the outermost ring of the rotary conveyer body and which set screws frictionally engage the plates to hold them elevated at times, as will be described.

Carried by each plate 109 is an outstanding flange 113 and secured to the machine frame in the path of movement of said flanges 113, near the carton feeding means, is a roller 114 whose function is to engage the flanges 113 and elevate them to bring the plates 109 to positions above the plane of the bottoms of the carton pockets, whereby to provide stops to prevent the cartons from movements outwardly when their flaps are acted on to close their inner ends.

Fixed to the machine frame, in the path of the flaps of the cartons projecting inwardly beyond the pockets on the rotary conveyer, and in a direction beyond the carton feeding means is a wiper 115, which engages the flap at one side of the carton and folds it inwardly to overlie the carton end.

As shown only by dotted lines in Fig. 8, there is a sprocket wheel 116 mounted beneath the fixed support 35, connected by a chain 117 with a sprocket wheel 118 on the shaft bearing the crank 44 which drives the rotary conveyer. Rotatable with the sprocket wheel 116 is a spur wheel 119 which meshes with a spur wheel 120 on the shaft 121 which extends upwardly through the support 35 and has fixed thereto a pair of miter gear wheels 122 and 123. The lowermost miter gear wheel 122 meshes with a wheel 124 carried on a shaft 125 which extends outwardly to a point near the conveyer body in line with the carton feeding means and carries at said end, as shown in Fig. 39 a sweep 126, which in its rotation engages the rearmost side flap of the carton and folds it to overlie the carton end, where it will be held by the wiper 115.

With the side flaps folded and held as just described the next step in closing the one carton end is to fold the end flap to the carton bottom.

The means for accomplishing this step is illustrated in Figs. 8 and 40 and comprises a plate 127, secured to the wiper 115 and projecting inwardly therefrom with its free margin standing in the plane of the bottom flap of the carton and in line with the folding line between said carton bottom and its flap.

Mounted on the fixed support 35 to stand in the path of the flap of the carton bottom is a guide 128 whose function is to pick up such bottoms and flaps that hang below the plane of the guide and direct them to the plane of the guide.

Mounted on the fixed support 35 opposite the guide 128 and plate 127 is a shaft 129 carrying a flap folder 130 revoluble in a direction to engage beneath the outer end of the flap and bend it upwardly over the fixed plate 127 as shown in Fig. 40.

Mounted on the fixed support paralleling the shaft 129, is a shaft 131 which is miter geared to the shaft 121 and which shaft 131 imparts motion to the flap folder 130 through a sprocket gear connection 132.

With the flap of the bottom folded as just described the next operation is to insert the flap between the carton body and the end flaps and move the carton bottom to a fully closed position.

This last mentioned operation is accomplished by the means illustrated in Figs. 8 and 41 and comprises a plate 134 which is movable toward and away from the inner carton end and is located in the path of the carton immediately following the flap folding means just described.

This plate occupies a plane immediately below the top of the carton as held in the pocket of the rotary conveyer and its function is to direct the flap of the bottom into the carton body. For moving the plate 134 I arrange a shaft 135 having a miter gear connection 136 with the shaft 121 and carrying a crank 137, which connects with the plate 134 by means of a rod 138.

Mounted on a shaft 139, carried by the fixed support 35 beneath the plate 134 is a plate 140 which is swung on its supporting shaft to lift the carton bottom and move it to a vertical position closing the carton end at the time when the plate 134 is holding the carton body open to receive the flap of the carton bottom as shown in Fig. 41. This plate 140 receives its motion through crank 141 and rod 142 driven by a sprocket gear connection 143 with the shaft 135.

By reason of the crank drives for the plates 134 and 140 they operate at all times in a vibratory manner which I find facilitates their work.

The carton having its one end fully closed is now moved to register with the soap and wrapper feeding means and to lower the plates 109, which have held the cartons during the time their inner ends were being closed, the flanges 113 of the plates 109 engage the bed plate 72 of the soap press and are moved to planes below the carton pockets, so that the soap and wrapper ram 98, may move the soap and its wrapper into the carton.

In order to prevent the carton from being moved inwardly relative to its pocket on the rotary conveyer during the time the ram 98 is operated, I provide a rail 144 fixed to the support 35, which rail stands in a position to engage the inner, closed, carton ends during the time the outer carton ends are being acted on to fully close the cartons after the soap and its wrapper have been inserted.

The means for closing the outer carton ends is illustrated in Figs. 29, 38, 42, 43, 44, 45, 46, 47, 48, 49 and 50, and comprises a wiper 145 which engages the end flap at one side of the carton and folds it inwardly to overlie the carton end as shown in detail in Figs. 42, 43, 44 and 45.

To bring the opposite end flap of the carton to a position overlying the carton end I provide a sweep 146 rotatably carried by a shaft 147 mounted in the machine frame near the path of the rotary conveyer beyond the soap and wrapper feeding means, which shaft 147 has a miter gear connection 148 with the shaft 50. Secured to the wiper 145 is an outstanding plate 149, in the plane of the top of the carton, as held on the rotary conveyer, and of a width corresponding to the width of the top flap of the carton, or outer end flap as it lies in the machine, so that its outer margin stands at the folding line, between the carton top and its flap.

For depressing such carton tops as may be brought to the plate 149 bent upwardly or above the plane of the plate I provide a bracket 150, which is fixed to the machine frame opposite and in a plane above the wiper 145 to support a hinged leaf 151 carrying at its free lower end a conical guide 152, rotatably mounted in a bearing formed by the leaf and which guide bears against the flaps of the carton tops.

To bend the flap of the top I arrange a folder 153, which is bodily rotatable on a shaft 154 having a miter gear connection 155 with the shaft 147, carrying the sweep 146, which folder in its movement engages the flap and bends it over the plate 149, as shown in Fig. 46.

Immediately following the flap bending means is a guide 156, as shown in Fig. 47 which further bends the flap and also bends the carton top downwardly relative to the carton body in a position to be acted upon by a plate 157, mounted to rock in front of the carton top to move the top and its flap to a position closing the carton. A second curved plate 158 whose free margin is arranged in advance of the plate 157 whereby it will enter the carton body to distend it, facilitates the insertion of the flap of the carton top. The plate 157 is operated by means of a crank driven rod 159, which receives its motion through sprocket connection 160 with the shaft 161, that, in turn, has a miter gear connection 162 with the shaft 50.

This plate 157 has its bearing formed larger than its supporting shaft so that it may wabble thereon, that is rock axially on its support, in a manner to alternately apply pressure to the carton top, first at its one side then the other.

This wabbling motion is imparted by means of a crank driven rod 163, as shown in Fig. 42 which is geared as shown in Fig. 38 to receive motion, through intermediate gearing 300, from a belt driven pulley 164.

The plate 158 is carried on an arm 165 pivotally supported on the machine frame and is moved toward and away from the carton by means of a crank driven rod 166, having a sprocket connection 167 with the shaft carrying the crank that drives the rod 159 which actuates the plate 157.

In some instances the carton tops and bottoms are warped when acted on as just described to close the cartons, that is bulged outwardly from the carton ends, and to straighten said carton tops and bottoms to "square" the cartons, to render them more sightly, and to facilitate, and economize in packing, I mount on the frame of the machine immediately following the final carton closing mechanism just described, a pair of arms 168, one on each side of the rotary conveyer, which arms each support, pivotally, a spring actuated lever 169 having rollers 170 which bear on the carton ends and press them to true rectangular relationship with the carton bodies held in the pockets of the rotary conveyer.

*The wrapper folding means.*

This means is illustrated in Figs. 9, 10, 21, 22, 23, 24, 25, 26, 27 and 28 and comprises the endless belts 68 and 69 referred to in connection with the soap feeding and wrapping mechanism.

At their ends opposite the soap feeding and wrapping mechanism the belts 68 and 69 are mounted on pulleys 171 and 172 respectively carried on shafts 173 and 174, which shafts are mounted in a frame 175 comprising spaced cheek plates, and said belts are arranged to receive between them the completely folded wrappers.

Leading to the wrapper folding machine from a means, not shown, for selecting sheets of paper, the wrappers, and delivering them, one at a time, is a belt conveyer 176, whose end, at the wrapper folding machine is supported on a pulley 177.

Mounted in fixed bearings in the frame 175 immediately adjacent the discharge end of the belt conveyer 176 is the main shaft 178 of the wrapper folder, which shaft, outside the frame 175 carries a pulley 179 for connection with power.

Extended through the frame 175 to the rear of and in a plane above the main shaft 178 is a shaft 180, on which outside the frame, at each side, are spring actuated arms 181, between which there is rotatably carried a shaft 182, in approximate vertical alinement with and above the main shaft 178.

On each of the shafts 178 and 182, inside the frame, are rollers 183 and 184, respectively, which peripherally engage and between which the unfolded wrappers are fed by the belt conveyer 176.

Fixed in the machine frame and inclining rearwardly and upwardly from the roller 184 is a rack 185, comprising spaced bars, whose lower ends are disposed in annular grooves 186 formed in the roller 184. Beneath and spaced from the rack 185 and in parallelism therewith is a like rack 187, forming with the rack 185 a guide for the wrapper as advanced by the rollers 183 and 184. Near the outer or upper end of the two racks and therebetween is a stop 188, located a distance from the rollers 183 and 184 equaling nearly half the length of the unfolded wrapper, whereby to stop the advancement of the forward half of the wrapper to cause it to bend at its approximate longitudinal center, by the advancement of its rearmost half.

The numeral 189, designates a grooved roller, which stands in a position to the rear of and in engagement with the roller 183, and to co-act with the roller 183, to catch the bent middle portion of the wrapper, to draw it from the guide comprising the racks 185 and 187 and from the belt conveyer and conduct the double wrapper to a guide 190, which inclines downwardly and forwardly from the rollers 183 and 189.

This guide is constructed like the guide comprising the racks 185 and 187, except for length and has a stop 191 located near its outer or lower end spaced from the rollers 183 and 189, a distance approximately equaling one-fourth the length of the wrapper.

Located in fixed bearings beneath the roller 189 is a shaft 192 on which is a grooved roller 193, co-acting with the roller 189 to catch the middle of the twice folded wrapper and to advance it to a guide 194, inclining rearwardly and upwardly from said rollers 189 and 193, having a stop 195, located from said rollers a distance approximating one-eighth the length of the wrapper, whereby to give the twice folded wrapper, a third fold at its approximate longitudinal center.

At the lower end of the guide 194 and in engagement with the roller 193 is a grooved roller 196 co-acting with the roller 193 to draw the wrapper from the guide 194 and guide 190, complete its folding and deliver it between the belts 68 and 69, by which it, the completely folded wrapper, is carried to the soap press.

The diagrammatical Figs. 24 to 28 show by arrows the direction of rotation of the rollers just described.

The rollers 184 and 193 receive motion through spur gear wheels 197 and 198 meshing with a spur gear wheel 199 carried by the main shaft 178, while the rollers 189 and 196 are frictionally driven from the rollers 183 and 193.

In order to hold the roller 189 against both rollers 183 and 193 I mount it on a floating shaft 200, suspended from a second floating shaft 201 on arms 203 carried by a rock shaft 204.

To rock the shaft 204 to depress the roller 189 against the roller 193 I provide a spring actuated arm 205 and to rock the floating shaft 201 to hold the roller 189 against the roller 183 I provide the spring actuated arm 206.

The roller 196 is carried on a floating shaft 207 supported on arms 208 carried on a rock shaft 209, and to hold the roller 196 against the roller 193 I provide on the rock shaft 209 a spring actuated arm 210.

The belt 69, of the conveyer for the folded wrappers is driven by a sprocket connection 211 with the shaft supporting the roller 193 and the belt 68 of said conveyer has its shaft 173 mounted on a bell crank lever 212, whose one arm is provided with an adjusting means 213 whereby to cause the belt 68 to be driven frictionally from the belt 69.

*The carton stacking means.*

This means is illustrated in Figs. 8, 29, 30, 31, 32, 33, 34, 53, 54 and 55 and comprises means for ejecting the filled cartons from the rotary conveyer, stacking the cartons in lots of 100 each, then moving the stacks of one hundred cartons within a boxing means.

The carton ejector is illustrated in Figs. 29, 30 and 31, and consists of a shelf 214, mounted in the plane of the pockets of the rotary conveyer, and at a point diametrically opposite the soap press. This shelf is long enough to receive a line of five cartons, disposed lengthwise of the shelf and of a width, approximating the carton width.

The machine frame carries a pair of bearings 215 in a plane above and laterally removed from the shelf in which there is slidably mounted a rod 216, carrying near its end, toward the rotary conveyer, an ejecting arm 217, which normally stands at the inner ends of the carton pockets and which in its movements, traverses the carton pockets and moves the cartons therefrom to the shelf 214.

For imparting motion to the rod carrying the ejector arm I employ a rock lever 218, as shown in Fig. 29, having its one end connected with the rod 216, by means of a link 219 and having at its other end a pin 220 which traverses a groove 221 in a cam wheel 222, carried on the shaft 161, referred to in the description of the carton closing mechanism.

The frame supporting the shelf 214 comprises two uprights 223 which serve as guides for a frame 224, having the rollers 225 which bear on said uprights.

The uprights 223 support a pair of walls 226, standing at right angles to the shelf 214, and which walls are spaced a distance equaling five carton lengths.

Carried by the frame 224 and movable vertically thereby, between the fixed walls 226, is a platform 227 which comprises five plane surfaces, extending the width of the platform and each having a width equal to the width of a carton. As shown in Fig. 30 these plane surfaces bear a stepped relationship with each other and incline rearwardly and upwardly from the shelf 214.

At the time of starting the machine, the platform 227 stands in the plane of the shelf 214 in a position to receive on its first plane surface a line of five cartons from the shelf 214.

On the machine frame forwardly of the shelf is a pair of guides 228 in which is supported a rod 229, carrying at its end next the shelf a plate 230, extending the length of the shelf and which in its movement pushes the five cartons supported by the shelf onto the first plane surface of the platform.

The means for moving the rod 229 and plate 230 are timed to act with the means for moving the platform so that when the plate has moved five rows of five cartons each onto the platform the platform will be lowered one carton height so that that five rows of five cartons each may be moved over the first group of cartons.

The platform is then moved a second and third time until the plate 230 has moved onto the platform one hundred cartons in a stack five cartons wide, five cartons long, and four cartons high.

This stack is then moved onto a boxing means, hereinafter described, by a means timed with the plate 230 and with the platform moving means.

For imparting motion to the rod 229 and plate 230 I arrange a shaft 231, normally disconnected from the shaft 161, on which shaft 231 I mount a crank 232 having a link connection with the stem 229.

Mounted to the rear of and in a plane beneath the shafts 161 and 231 is a shaft 233 receiving its motion from the shaft 161 through a worm wheel 234 on the shaft 233, a worm 235, a shaft 236 and a miter gear connection 237 with the shaft 161.

Mounted on the shaft 233 is a wheel 238 having in its periphery twenty notches 239, which is arranged to co-act with the detent 240, carried on a bell crank 241, which bell crank carries at its end opposite the detent, a wiper 242, whose function is to operate a clutch comprising a disk 243 secured on the shaft 161 and a bolt 244 secured on the shaft 231.

The disk 243 carries a projection 245 and the bolt 244 is spring actuated to move into the path of said projection.

The wiper 242 co-acts with a pin 246 on the bolt to hold the clutch inoperative.

During the time the ejector is being operated to place a row of five cartons on the shelf, the plate 230 is standing forwardly of the row of cartons and the detent is riding the periphery of the wheel 238, in a position to hold the wiper 242 in engagement with the pin on the clutch bolt and when the five cartons have been placed on the shelf the wheel is rotated to bring one of its twenty notches in position to permit the detent to drop therein, and this movement of the detent, rocks the bell crank 241 to release the wiper from the pin on the clutch bolt whereby its spring will cause it to be moved into the path of the projection on the disk secured to the shaft 161. Thus the shaft 231 is rotated to effect a movement of the plate 230, through the rod 229, link, and crank 232.

The means for moving the entire stack of one hundred cartons from the platform 227 into the boxing means is illustrated in Figs. 29, 34, 54 and 55 and consists of a rod 247, mounted in guides 248, having at its end near the platform 227, beneath and forwardly of the shelf 214 a vertical plate 249 which is approximately the height of four cartons and extends between the walls 226. For moving the rod 247 I provide a shaft 250, connected with the shaft 161 by a sprocket connection 251 and a second shaft 252 having a crank and link connection 253 with the rod 247.

Between the shafts 250 and 252 I provide a clutch 254 in all particulars like the clutch just described, for connecting the shafts 161 and 231 and operate this clutch by means of a wiper 255, like the wiper 242, a bell crank lever 256, a detent 257 and a wheel 258 having a single notch 259, which wheel 258 is secured to and rotates with the shaft 233.

For operating, raising, and lowering, the platform 227 in time with the movements of the push plates 230 and 249 I arrange on the shaft 233 a multi-faced cam 260 and a rock-lever 261, which lever engages the cam 260 at its one end and a pin 262 carried by the frame 224 of the platform 227 at its other end.

The cam 260 is peripherally divided into four distinct faces A B C and D of different radii and a radial shoulder E. As shown in Fig. 55 the rock lever 261 has its one end in engagement with the cam face A holding the platform 227 in the plane of the shelf 214. In Fig. 34 the rock-lever 261 is engaging the cam face B holding the platform 227 in a plane one carton height beneath the shelf 214.

In this manner the cam faces C and D operate to lower the platform two and three carton heights below the plane of the shelf.

At this time I have one hundred cartons on the platform and am ready to move the entire stack from the platform, after which the cam face E serves to rock the lever to return the platform to the plane of the shelf.

In order to facilitate the movement of the platform, I secure to the rock-lever 261 a counter balance 263, which serves to raise the platform after the cartons have been moved therefrom.

In order to lock the platform against upward movement during the time the cartons are being moved therefrom to permit the push plate 249 to return to its initial position, out of the path of the platform 227 I provide a spring detent 264, arranged to engage a stud 265 on the rock lever when the platform is at its lowermost limit and which spring detent is released from holding said stud by a lateral extension 266 of the pushplate, as shown in Figs. 34 and 55.

In order to preserve true rectangular stack formation of the cartons as supported on the platform 227, I arrange a gate pivotally mounted on the machine frame in a position to engage the rearmost cartons of the uppermost layer. As shown in Fig. 32 this gate is provided with a spring whose function is to normally hold the gate in position to engage the rearmost line of cartons in the uppermost layer and in order to swing the gate to free it from the cartons, during the time the platform is being lowered, I arrange a pitman connected at its one end to a wrist pin operatively associated with the gate, and which pitman is at its other end brought to a position where it will engage the notched wheel on the shaft 233.

Mounted in a plane over the shelf 214 in alinement with and opposite the plate 230 is a plate arranged to co-act with the plate 230 to hold the cartons in alinement on the shelf and which plate is moved by the cartons when they are moved to the platform 227, after which the plate resumes its normal position.

At times the carton ends leave the rotary conveyer not fully seated in the bodies on the cartons to the end that such deficient closing of the cartons causes the row of cartons on the shelf to occupy a space longer than the shelf and in order to hold the five cartons to a length not in excess of the width of the platform, I arrange at the receiving end of the shelf a pawl under which the cartons, as ejected from the rotary conveyer, are moved, and which pawl drops to the rear of each carton, thus holding the cartons from retrograde movement.

*The boxing means.*

The boxing means is illustrated by Figs. 32, 33 and 34 and comprises upright guides 267 between which rides a platform 268 having secured thereto at its two sides and at its rear, the upstanding walls 269 and 270 forming a receiver arranged to receive the stack of one hundred cartons from the platform 227 of the stacking means just described.

At the top of each of the walls 269 and 270 there is a lateral offset 271 which as shown in Fig. 34 is arranged to receive thereover a wooden box which box is of a capacity to receive the one hundred cartons.

To the rear of the rearmost upright 267 there is mounted a shaft 272 on which is mounted to rotate with the shaft, a frame 273 which may be rocked as shown by dotted lines in Fig. 33 to move the stack of cartons, which are at this time within the box, to an inverted position to rest upon the platform 274.

Figs. 33 and 34 show the receiver consisting of the walls 269 and 270, in a position to receive the stack of cartons from the stacking machine, in which position the said walls of the receiver support the wooden boxes in a plane above the path of movement of the stack of cartons. These walls of the receiver are then depressed manually to bring the wooden boxes to cover the stack of cartons. It is in this position that the entire frame 273 is rocked to place the box containing the cartons open side up upon the platform 274.

In order to restore the walls of the receiver to their initial position I provide a counter balance 275 which consists of a sprocket wheel 276 and chain 277 fixedly mounted beneath the receiver, which chain carries at its one end a weight 278 and has its other end connected with the movable walls of the receiver.

The frame 273 is rocked from its receiving position to its discharging position by means of a crank 279.

*The automatic trouble detecting and machine stopping means.*

This means is illustrated in Figs. 8, 16, 56, 57, 59 and 60 and consists of an electro-magnetically operated clutch for connecting and disconnecting the main shaft of the machine with a driving shaft; fixed electric contact points in circuit with the electromagnet of said clutch, and movable electric contact points, timed to operate, one with the conveyer to detect the absence of a carton in the conveyer, one to detect the improper positioning of a carton in the conveyer, and one to detect the absence of a wrapper at the soap press.

As shown in Fig. 56 the shaft 50 connected with the soap conveyer, and the shaft 7 connected with the carton feeding means, the soap press and the soap feeding means, are each directly connected with a shaft 65, the shaft 50 having a miter gear connection 66 with the shaft 65 and the shaft 7 having a sprocket gear connection 269 with the shaft 65.

Between the shaft 65 and a shaft 270, which latter shaft is directly connected with power, and preferably extends from the soap cake forming means hereinbefore referred to, but not illustrated, is a clutch 271 the one member of which is connected with the shaft 65, while the other member of the clutch is carried on a sleeve 272 in which sleeve there is an annular groove 273. Pivotally mounted adjacent to the sleeve 272 is a lever 274 having at its one end a pin 275 arranged to ride in the groove 273 of said clutch sleeve, and at its other end a contractile spring 276 which spring will normally tend to hold the clutch sleeve in a position to disconnect the clutch members.

On the lever 274 adjacent the point of connection of the spring 276 is a shoulder 277 arranged to coact with a hook 278 to hold the lever 274 in a position against the tension of the spring 276, holding the movable clutch member to operative position.

The hook 278 is pivotally mounted and carries at its end opposite its hook, an armature 279, which armature coacts with an electromagnet 280, in an electric circuit including a fixed contact 281 illustrated in detail in Fig. 59, a fixed contact 282 illustrated in detail in Fig. 60, a fixed contact 283 at the soap press as shown in Fig. 16 and the movable contact 284 in normal broken circuit with the contact 281 and movable contact 285 in normal broken circuit with the contact 282 and movable contact 286 in normal broken circuit with the contact 283. In this electric circuit I include an audible alarm sounding device such as a bell 287. The movable contact 284 is carried on a rock-lever 288 whose one end is arranged to engage a cam 289 secured to and rotatable with the shaft 7, while the other end of the rock-lever stands in a position immediately over the path of the carton on the rotary conveyer immediately following the carton feeding means, and at said end on the rock-lever over the carton path I suspend a link 290 which is rocked by said lever to "feel" a carton in the pocket of the conveyer.

When there is a carton present, the link 290 when rocked toward the carton will engage the carton and thus hold the movable contact 284 out of contact with the fixed contact 280 and thus hold the circuit broken.

In the event the carton feeding means fails to place a carton in a pocket, the link 290 will be depressed beyond its normal movement and permit the movable contact 280 to engage the contact 281 and thus establish a circuit which will energize the bell 287 and simultaneously therewith energize the electromagnet 280 which draws the armature to free the hook 278 from the shoulder 277 of the lever 274 and permit the spring 276 to rock the lever 274 to throw the clutch to disconnect the driving shaft 270 from the driven shaft 65 thereby stopping the entire machine. The contacts 282 and 285 are positioned adjacent the path of the rotary conveyer immediately following the inside flap folding means.

At times imperfect cartons are placed in the magazine which the feeding means fail to properly, or fully, seat in the receiving pockets on the conveyer. For this reason I mount the movable contact 285 as shown in detail by Fig. 60, in a position to be engaged by a carton extended beyond the conveyer pocket, in which event the carton will engage said contact 285, and move it to engage the fixed contact 282, and thus establish an electric circuit which operates the bell 287 and clutch 271.

The fixed contact 283 is positioned at the soap press where the wrappers for the soap must pass thereover and the movable contact 286 is positioned to operate immediately over the contact 283. This contact 286 is carried on a rock-lever 291 which is insulated from the frame on the machine and which at its end opposite the contact 286 is acted upon by the cam 289, which cam causes the contact 286 to move vertically over the contact 283 in such manner as to engage a wrapper in each operation. The wrapper being an insulator holds the contact 286 from engaging the contact 283, but in the failure of the wrapper feeding machine to operate properly and no wrapper is conveyed to the soap press, the contact 286 establishes a circuit to sound the alarm and throw the clutch 271. By this alarm the operator is given notice of the failure of the machine to properly operate, and during the time the machine is stopped any deficiencies or inaccuracies of the machine may be corrected, after which time the operator manually moves the lever 274 to re-set the clutch, and by the hook 278 hold the clutch in operative position.

Having thus described my invention, what I claim as new therein and desire to secure by Letters-Patent of the United States therefor is:

1. A machine of the class described, comprising in combination a conveyer, means for feeding cartons, having flaps, to the conveyer, means for feeding articles to the cartons on the conveyer, and means in the path of the cartons on the conveyer for folding the flaps of the cartons and inserting certain of same into the ends of the cartons.

2. In a machine of the class described, a carton selecting and delivering means for cartons, having flaps, an article selecting and delivering means, means for folding the flaps of the cartons and inserting certain of same into the ends of the cartons and a conveyer relating all of said means.

3. A machine of the class described comprising in combination, means for selecting, opening, and delivering cartons, having end flaps, means for inserting an end flap into one carton end, means for inserting articles into the cartons, means for inserting a second end flap into the other carton end, and a conveyer relating all of said means.

4. In a machine of the class described, a magazine for cartons having end flaps, means for selecting, opening and ejecting cartons from said magazine, a rotary conveyer having uniformly spaced pockets for receiving said open cartons from said magazine, means lying adjacent the path of said conveyer for inserting certain of the flaps into one of the ends of the carton, means in the path of the said conveyer for placing an article in the cartons open at their one end, means in the path of said conveyer for completely inserting certain other of the flaps into the other ends of the cartons, and means for ejecting the filled and closed cartons from the pockets of said conveyer.

5. In a machine of the class described, a conveyer, means for imparting to said conveyer intermittent motion, uniformly spaced pockets carried by said conveyer, means timed to operate with said conveyer for placing cartons with their flaps, open at each end into the pockets, means for holding the cartons in said pockets against relative movement therewith, means contiguous to the path of said conveyer for inserting certain of the flaps into the cartons at their one end, means for wrapping articles and placing the wrapped articles in said open ends of the cartons held in the pockets of said conveyer, and means contiguous to the path of the conveyer for inserting certain of the flaps into the other ends of the cartons.

6. In a machine of the class described, a rotary circular conveyer carrying uniformly spaced carton-holding means, means for imparting intermittent motion to the conveyer, means for inserting cartons successively into the carton-holding devices of the conveyer, means for filling the cartons with the articles they are to carry after they have been inserted into the holders of the conveyer, means for closing the cartons, and means for removing the filled cartons from the conveyer holders, the said means for inserting cartons into the holders, for filling the cartons, and for removing the filled cartons, acting radially relative to the circular conveyer.

7. A machine such as described in claim 6 wherein the carton-inserting and carton-filling means operate inwardly, toward the center of the conveyer, and the carton-removing means operate outwardly.

8. In a machine of the class described a conveyer comprising uniformly spaced carton holding devices, means for imparting to said conveyer a step by step movement, means for introducing into each succeeding pocket an open ended carton, means for closing the cartons at their one end, means for holding the cartons against movements in said pocket during the times said last mentioned means are operated, means for restoring said carton holding means to non-holding positions, means for inserting articles into said cartons, means for closing the other ends of said cartons; a second carton holding means operatable during the times of the operation of the last mentioned means, and means for ejecting the filled and closed cartons from said pockets.

9. An organized mechanism comprising carton delivering means, means for wrapping articles, means for placing the wrapped articles into the cartons, means for closing the cartons after they have been filled, a conveyer relating all of said means, a common driving means for the conveyer, and all of said mentioned means, and a means for disconnecting the power from the organized mechanism in the event one of the functionate means fails to properly operate.

10. In an organized mechanism a conveyer, means for supplying to said conveyer at uniformly spaced intervals an open carton having flaps at each of its ends, means for folding the flaps at one of the carton ends, means for wrapping an article, means for inserting the wrapped articles into said cartons, means for closing the flaps at the other end of the cartons, an electric circuit comprising contacts in normal broken arrangement adjacent certain of said parts of the organized mechanism, and means included in said circuit for disconnecting the organized mechanism from power upon the failure of the parts, having said contacts, to properly operate.

11. In a machine of the class described the combination with a conveyer having a rectangular pocket of a table comprising tapering walls arranged to register at times with the rectangular pocket, and in the same plane therewith, a magazine over said table, means for selecting from said magazine, one at a time, the cartons held therein, which means comprises a blade for insertion into the lowermost carton, a fin, carried by said blade for partially opening the selected carton, and a hook for positively moving and engaging the selected carton, and moving it through said tapering walls to conform the partially opened carton to the pocket, and finally place the fully opened carton into said pocket.

12. A machine of the class described comprising in combination a movable conveyer comprising carton holding devices, means for feeding to said conveyer collapsed cartons provided with flaps, means contiguous to the path of said conveyer for folding the side flaps of the cartons, means contiguous to the path of said conveyer, following said side flap folding means, for folding the carton bottom and then the end flap of the bottom into the body of the carton as held in one of the devices of the conveyer.

13. In a machine of the class described, a carton holding pocket, means for inserting a collapsed carton provided with end flaps in said pocket, means for distending the one end of the carton held in said pocket, and a vibrating and wabbling element for moving the carton end to closed position and inserting the flap of said carton end into the distended end of the carton.

14. In a machine of the class described, a conveyer, a carton holding pocket on said conveyer, an article feeding means comprising a bed plate in the plane of the pocket of the conveyer, a spring held article support in a plane above said bed plate, an article conveyer leading to said spring held support, a press for moving the articles from said spring-held support to said bed plate, and a ram for moving the articles from said bed plate to positions within the cartons held by said pockets.

15. In combination with a conveyer arranged to hold thereon an open carton with its flaps extended, a plate stationary relative to the conveyer against which the end-closing flap of the carton is adapted to be held, and a movable element coöperating with the fixed plate for bending the flap of the carton and relative to the carton end, means for distending the body of the carton and inserting said bent end flap into the carton body.

16. An organized mechanism comprising a conveyer, pockets on said conveyer into which cartons having flaps are introduced and held, a magazine for the cartons, means for selecting the cartons one at a time from the magazine and opening and introducing them to successive pockets on said conveyer, means for folding certain of said flaps and inserting certain of same into one end of the carton, means for wrapping articles and inserting same into cartons, means for folding certain other of said flaps and inserting certain of same into the other ends of said cartons, means for stacking a predetermined number of the filled and closed cartons and a means for boxing the predetermined number of cartons.

17. In combination with a magazine for holding a number of cartons in the flat, means for agitating and holding the cartons in vertical alinement, a plate and a fin carried by the plate for removing the cartons one at a time from the magazine and opening same.

18. In combination with a movable carton holding pocket, means for holding a carton in the flat, a table extending from the holding means to said movable pocket, upstanding walls convergent from the holding means toward said pocket, and a device for entering the carton opening same and moving it between said convergent walls, and seating it fully opened in said pocket.

19. In a machine of the class described a rotary conveyer provided with pockets for holding filled and unfilled cartons provided with flaps, means for inserting the flaps in one end of the carton before it is filled, and means for distending the filled carton and inserting the flaps in the other end while the carton is still in the pocket of the conveyer.

20. In a machine of the class described, a table, a magazine adjacent to said table for holding a stack of collapsed cartons, means for holding single cartons and moving them along the table, means for removing a single carton from the bottom of the stack and placing it in said holding means, means for opening the collapsed carton, means for placing a can in said carton, and means for closing the carton at each end.

21. In a machine of the class described, a table, a magazine adjacent to the said table for holding a stack of collapsed cartons, means for holding single cartons and moving them along the table, means for removing a single carton from the bottom of the stack and placing it in said holding means, means for opening the collapsed carton, means for placing a wrapped article in said carton, and means for closing the carton at each end.

22. In a machine of the class described, a conveyer provided with a series of pockets for holding filled and unfilled cartons, means for imparting an intermittent movement to said conveyer, a magazine capable of holding a stack of collapsed cartons provided with flaps, means for selecting a single carton from the stack, inserting and opening it into a pocket on the conveyer, means for closing one end of the carton, means for inserting an article into the open ended carton and a vibratory means for closing the end of the filled carton.

23. In a machine of the class described, a magazine for holding a series of collapsed cartons, an intermittent and rotary conveyer provided with pockets for holding filled and unfilled cartons, means for selecting from the stack of collapsed cartons a single collapsed carton and maintaining the remainder of the cartons alined in the stack, means for opening and placing the selected carton in a pocket on the conveyer, means for closing one end of the carton, means for wrapping and inserting an article into the carton having a closed end, means for closing the other end of the carton, and means for ejecting the filled and closed carton from the conveyer.

24. In a machine of the class described, a table, a magazine adjacent to said table for holding a stack of collapsed cartons, means for holding single cartons and moving them along the table, means for removing a single carton from the bottom of the stack and placing it in said holding means, means for opening the collapsed carton, means for filling the carton, and means for closing the carton at each end.

25. In a machine of the class described, comprising in combination a rotary and intermittent conveyer, means for feeding cartons provided with flaps to the conveyer, means for feeding articles to the cartons on the conveyer, and vibratory means in the path of travel of the cartons on the conveyer for introducing certain of the carton flaps into the end of the carton.

26. In a machine of the class described, the combination of a carton magazine for holding the cartons in the flat, means for opening the carton, an article reservoir, an ejector connected therewith, means for closing the flaps on one end of the unfilled carton, means for closing the flaps on the other end of the filled carton, means for ejecting the filled carton, and mechanism for intermittently engaging and advancing a carton through the machine.

In testimony whereof, I have signed my name to this specification, in presence of two subscribing witnesses.

THOMAS E. HEETER.

Witnesses:
EDWARD E. LONGAN,
E. L. WALLACE.